(12) United States Patent
Castro et al.

(10) Patent No.: US 10,929,376 B2
(45) Date of Patent: Feb. 23, 2021

(54) PERFORMING TRANSACTIONS IN DISTRIBUTED TRANSACTIONAL MEMORY SYSTEMS

(71) Applicant: Microsoft Technology Licensing, LLC, Redmond, WA (US)

(72) Inventors: Miguel Castro, Cambridge (GB); Dushyanth Narayanan, Cambridge (GB); Aleksandar Dragojevic, Cambridge (GB); Matthew Renzelmann, Redmond, WA (US); Alexander Shamis, Redmond, WA (US); Richendra Khanna, Seattle, WA (US); Stanko Novakovic, Cambridge (GB); Anders Gjerdrum, Tromso (NO); Georgios Chatzopoulos, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 15/933,230

(22) Filed: Mar. 22, 2018

(65) Prior Publication Data
US 2019/0294711 A1     Sep. 26, 2019

(51) Int. Cl.
*G06F 16/27* (2019.01)
*G06F 16/23* (2019.01)
(Continued)

(52) U.S. Cl.
CPC ......... *G06F 16/2329* (2019.01); *G06F 9/466* (2013.01); *G06F 9/467* (2013.01);
(Continued)

(58) Field of Classification Search
CPC ....................................................... G06F 16/27
(Continued)

(56) References Cited

U.S. PATENT DOCUMENTS

| 6,236,277 B1 * | 5/2001 | Esker ........................ G06F 1/14 331/14 |
| 8,856,491 B2 * | 10/2014 | Bacon ................. G06F 12/0261 711/216 |

(Continued)

OTHER PUBLICATIONS

Corbett, et al., "Spanner: Google's Globally-Distributed Database", In 10th USENIX Symposium on Operating Systems Design and Implementation, Oct. 9, 2012, pp. 251-264.
(Continued)

*Primary Examiner* — Baoquoc N To

(57) ABSTRACT

In various examples, there is provided methods performed by nodes in a cluster of nodes for performing transactions comprising one or more read operations and/or one or more write operations. The node comprises a local clock which is synchronized with a master clock and maintains a measure of uncertainty indicating current minimum and maximum values of the master clock. The method to perform transactions involving read operations generates a read timestamp representing a point in time which is earlier than a current minimum value of the master clock. The method then reads the objects and determines, for each of them, whether a timestamp associated with that object is later than the read timestamp. If so, an error handling procedure is performed for that object.

20 Claims, 11 Drawing Sheets

(51) Int. Cl.
G06F 9/46 (2006.01)
G06F 11/14 (2006.01)
H04L 29/08 (2006.01)
G06F 11/07 (2006.01)

(52) U.S. Cl.
CPC ...... *G06F 11/0745* (2013.01); *G06F 11/1446* (2013.01); *G06F 11/1474* (2013.01); *G06F 16/2322* (2019.01); *G06F 16/2343* (2019.01); *H04L 67/1097* (2013.01); *G06F 16/2315* (2019.01); *G06F 2201/835* (2013.01)

(58) Field of Classification Search
USPC .................................................. 707/610, 639
See application file for complete search history.

(56) References Cited

U.S. PATENT DOCUMENTS

| 2004/0088301 | A1* | 5/2004 | Mahalingam | G06F 16/10 |
| 2004/0153615 | A1* | 8/2004 | Koning | G06F 16/10 |
| | | | | 711/162 |
| 2007/0106857 | A1* | 5/2007 | Koning | G06F 11/1464 |
| | | | | 711/162 |
| 2010/0030802 | A1* | 2/2010 | Butler | G06F 16/284 |
| | | | | 707/687 |
| 2011/0246423 | A1* | 10/2011 | Jess | G06F 11/1471 |
| | | | | 707/639 |
| 2014/0089264 | A1* | 3/2014 | Talagala | G06F 3/0616 |
| | | | | 707/649 |
| 2014/0310243 | A1* | 10/2014 | McGee | G06Q 10/101 |
| | | | | 707/639 |
| 2015/0193454 | A1* | 7/2015 | Peretz | G06F 11/1461 |
| | | | | 707/639 |

OTHER PUBLICATIONS

Du, et al., "Clock-SI: Snapshot Isolation for Partitioned Data Stores Using Loosely Synchronized Clocks", In Proceedings of the IEEE 32nd International Symposium on Reliable Distributed Systems, Sep. 30, 2013, 12 Pages.

"International Search Report and Written Opinion Issued in PCT Application No. PCT/US19/021956", dated Jun. 11, 2019, 15 Pages.

* cited by examiner

PERFORMING TRANSACTIONS IN DISTRIBUTED TRANSACTIONAL MEMORY SYSTEMS

BACKGROUND

Many different types of applications can be arranged to run on clusters of computing nodes. By splitting out computational tasks and data storage between the nodes of a cluster, applications can be more readily scaled by including additional nodes within the cluster. However, in the design of such applications, it is necessary to mitigate any issues that may arise due to the failure of nodes within the cluster. Such applications may require each of the nodes in the cluster to be synchronized such that there can be considered to be a master clock with respect to which operations within the cluster can be performed. An example of such an application is a distributed transactional memory system. In a distributed transactional memory system, it is necessary to ensure that transactions are carried out within the cluster in strict sequential order so that the integrity of the memory system is preserved even where transactions are processed by different nodes in the cluster. Similarly, the timing of other operations relating to the memory system, such as garbage collection of historical versions of objects (where the memory system supports multi-versioning) also needs precise coordination between the nodes of the cluster. One known solution for synchronizing the nodes of a cluster is to provide a resilient (i.e. highly reliable) master clock signal to each of the nodes in the cluster.

The embodiments described below are not limited to implementations which solve any or all of the disadvantages of known clusters of nodes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples, there is provided methods performed by nodes in a cluster of nodes for performing transactions comprising one or more read operations and/or one or more write operations. The node comprises a local clock which is synchronized with a master clock and maintains a measure of uncertainty indicating current minimum and maximum values of the master clock. The method to perform transactions involving read operations generates a read timestamp representing a point in time which is earlier than a current minimum value of the master clock. The method then reads the objects and determines, for each of them, whether a timestamp associated with that object is later than the read timestamp. If so, an error handling procedure is performed for that object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
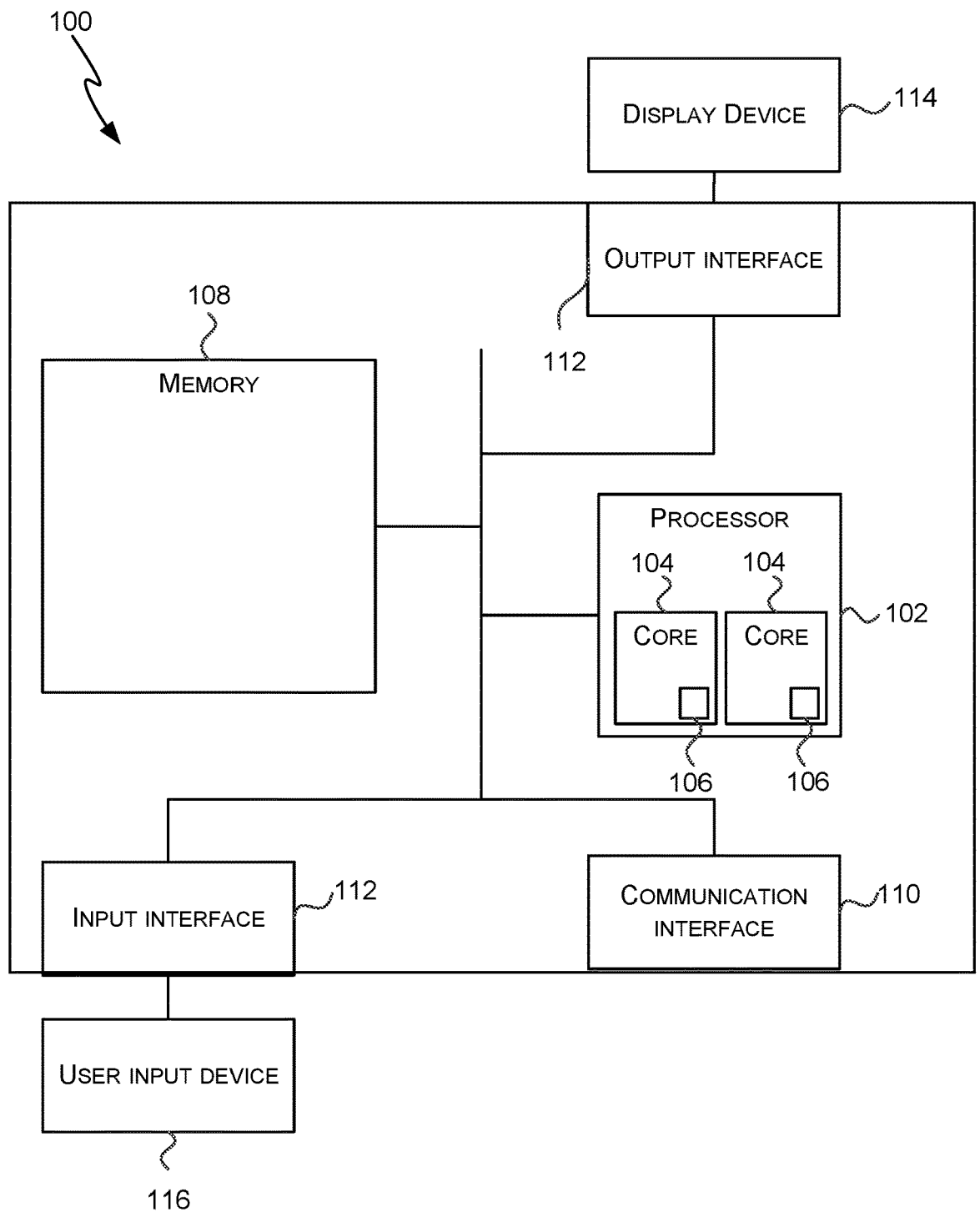
FIG. 1 illustrates an exemplary computing-based device in which embodiments of the systems and methods are implemented.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Some of the examples set out below allow optimistic concurrency control to be used in a distributed transactional memory system. This means that it is possible to benefit from the use of Remote Direct Memory Access (RDMA) reads to read objects residing on one node 210 at another node 210 in the cluster 200, since the use of RDMA reads prevents the use of pessimistic concurrency control. The use of RDMA reads to access objects helps to improve the speed with which objects can be accessed by nodes 210 within the cluster and helps prevent bottlenecks (since a remote note 210 can read an object residing on another node 210 without involving the processor of the other node 210).

Although the present examples are described and illustrated herein as being implemented in a computer system, the system described is provided as an example and not a limitation. As those skilled in the art will appreciate, the present examples are suitable for application in a variety of different types of computer systems.

FIG. 1 illustrates an exemplary computing-based device 100 which are implemented as any form of a computing and/or electronic device, and in which embodiments of the systems and methods disclosed herein are implemented in some examples.

Computing-based device 100 comprises one or more processors 102 which are microprocessors, controllers or any other suitable type of processors for processing computer executable instructions to control the operation of the device in order to. In some examples, for example where a system on a chip architecture is used, the processors 102 include one or more fixed function blocks (also referred to as accelerators) which implement a part of the various methods disclosed herein in hardware (rather than software or firmware). In some examples, one or more or all of the processors 102 respectively comprise two or more cores 104, each core having its own respective clock 106. The two or more cores 104 are able to process instructions independently from each other, thereby enabling the processor 102 to process multiple instructions simultaneously. Each of the cores 104 supports multi-threading, whereby each thread of execution processed by the core is processed substantially in parallel to one another by rapid context-switching of the core between each of the threads of execution. Each of the cores 104 comprises a respective clock 106 to which threads executing on that core can refer to obtain a timestamp representing the current time.

Platform software comprising an operating system or any other suitable platform software is provided at the computing-based device to enable application software to be executed on the device.

The computer executable instructions are provided using any computer-readable media that is accessible by computing based device 100. Computer-readable media includes, for example, computer storage media such as memory 108 and communications media. Computer storage media, such as memory 108, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 108) is shown within the computing-based device 100 it will be appreciated that the storage is, in some examples, distributed or located remotely and accessed via a network or other communication link (e.g. using communication interface 110).

The computing-based device 100 also comprises an input/output controller 112 arranged to output display information to a display device 114 which may be separate from or integral to the computing-based device 100. The display information may provide a graphical user interface. The input/output controller 112 is also arranged to receive and process input from one or more devices, such as a user input device 116 (e.g. a mouse, keyboard, camera, microphone or other sensor). In some examples the user input device 116 detects voice input, user gestures or other user actions and provides a natural user interface (NUI). In an embodiment the display device 114 also acts as the user input device 116 if it is a touch sensitive display device. The input/output controller 112 outputs data to devices other than the display device in some examples, e.g. a locally connected printing device (not shown in FIG. 1).

Any of the input/output controller 112, display device 114 and the user input device 116 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electroencephalogram (EEG) and related methods).

In some examples, the computing-based device 100 functions as a headless server and does not include any display devices 114 or user input devices 116. Instead, in such examples, the computing-based device 100 utilizes communication interface 110 to receive instructions and provide responses to other computing-based devices across a network (not shown in FIG. 1).

Figures 2A, 2B:
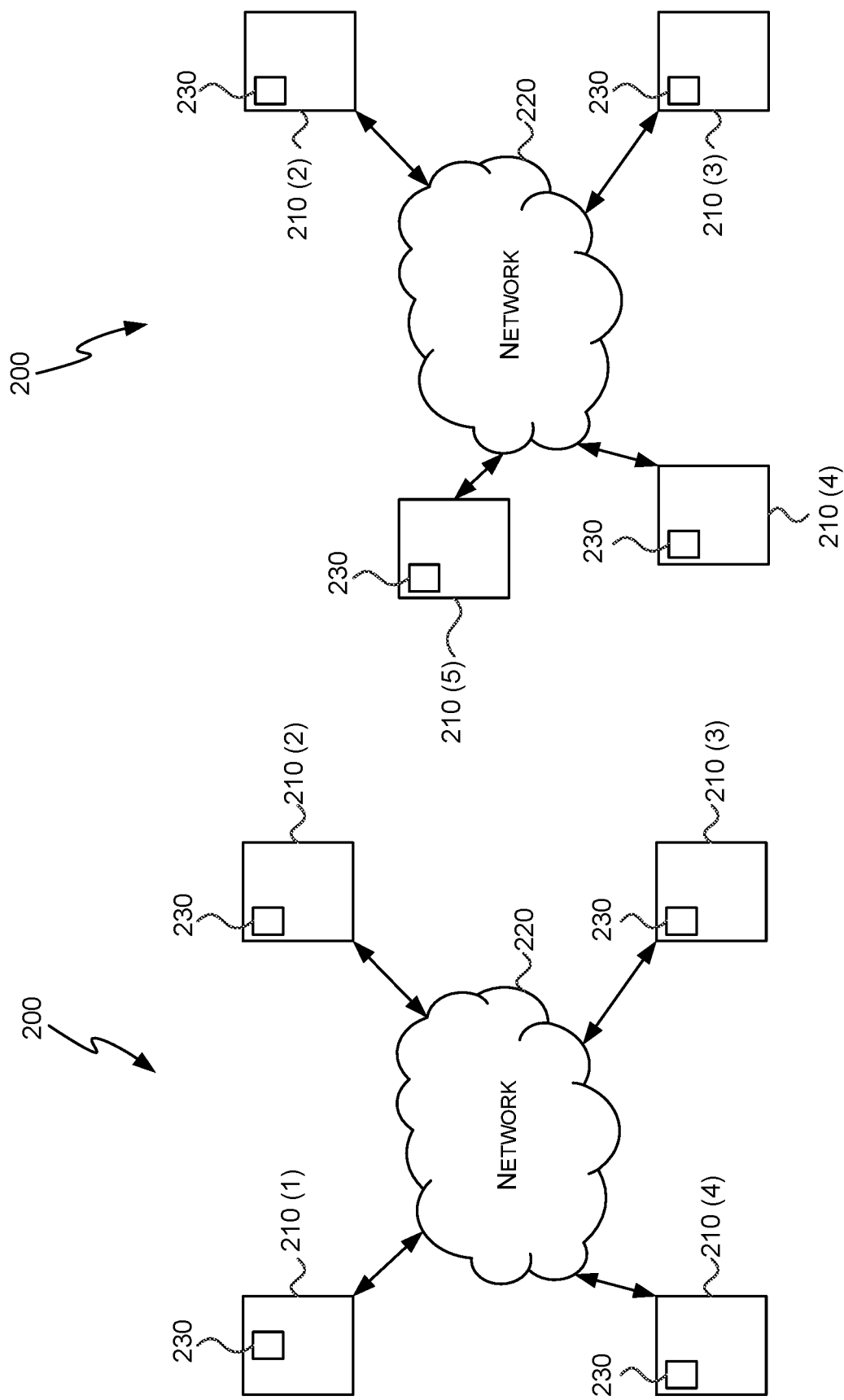
FIG. 2A illustrates an exemplary cluster of computing nodes upon which embodiments of the systems and methods may be implemented.
FIG. 2B illustrates the exemplary cluster of computing nodes shown in FIG. 2A following an exemplary reconfiguration of the cluster.

FIG. 2A illustrates an exemplary cluster of computing nodes 200 upon which embodiments of the systems and methods disclosed herein may be implemented in some examples.

The cluster of computing nodes 200 (which may also be referred to simply as the cluster) comprises a plurality of computing nodes 210 (or simply nodes). The plurality of computing nodes 210 are arranged to communicate with each other via a network 220. In the exemplary cluster 200 illustrated in FIG. 2A, the cluster 200 comprises four nodes 210(1), 210(2), 210(3) and 210(4). However, it will be appreciated that in other examples greater or fewer numbers of nodes 210 may be included in the cluster 200. The network 220 also enables the nodes 210 to communicate with other computing-based devices 100 which are connected to it.

The cluster of computing nodes 200 is able to change configuration during its operation. In order to determine when the configuration should be changed and what the new configuration should be, various existing configuration protocols may be used. In some examples, the configuration protocols allow the nodes 210 in the cluster 200 to self-select a configuration master node that is responsible for determining a new configuration of the cluster 200. For example, in the cluster illustrated in FIG. 2A, node 210(1) functions as the configuration master node for the cluster 200 and would identify nodes 210(1), 210(2), 210(3) and 210(4) as belonging to the cluster 200. However, in other examples, any of the other nodes 210 in the cluster 200 may function as the configuration master node for the cluster 200. In some examples, the configuration protocol described in the Microsoft Research paper "*No compromises: distributed transaction with consistency, availability, and performance*" by Dragojevic, Narayanan, Nightingale, Renzelmann, Shamis, Badam and Castro (copy available at https://dl.acm.org/citation.cfm?id=2815425) could be used.

FIG. 2B illustrates the exemplary cluster 200 of computing nodes 200 that is shown in FIG. 2A following an exemplary reconfiguration of the cluster 200. As part of the reconfiguration of the cluster 200, node 210(1) has been removed from the cluster 200 and a new node 210(5), which was not previously part of the cluster 200, has been added to the cluster 200. As such, following the exemplary reconfiguration of the cluster 200, the cluster 200 comprises nodes 210(2), 210(3), 210(4) and 210(5).

Reconfiguration of the cluster 200 may be performed periodically, to remove any nodes 210 that are degrading the performance of the cluster 200 and/or add additional nodes 210 to the cluster 200 as required. Alternatively, or additionally, the reconfiguration of the cluster 200 may be performed as the result of one or more of the nodes 210 in the cluster 200 becoming unavailable, for example as the result of a hardware failure or routine maintenance. Where the node 210 that is functioning as the master configuration node for the cluster 200 is removed from the cluster 200 following its reconfiguration (such as, for example, following a failure of the master configuration node), the configuration protocols used in some examples provide a mechanism for allowing a new master configuration node 210 to be determined for the cluster 200. For example, following the removal of the previous master configuration node 210(1) during the reconfiguration of the cluster 200 illustrated in FIG. 2B, the node 210(2) may be determined to be the new master configuration node for the cluster 200. The new master configuration node 210(2) may then inform nodes 210(3), 210(4) and 210(5) that the cluster 200 comprises the nodes 210(2), 210(3), 210(4) and 210(5) following the reconfiguration.

Each of the nodes 210 includes at least one local clock 230 with which it determines an appropriate to time to carry out various computing tasks that may be assigned to it. However, many applications which may be run on the cluster 200 of computing nodes 210, require the actions taken by processes running on the different nodes 210 of the cluster 200 to be coordinated across the entire cluster 200. This means it is necessary for the local clocks 230 of the nodes 210 to be synchronized such that they provide approximately the same time as each other.

In the exemplary cluster illustrated in FIG. 2A and FIG. 2B, this is achieved by nominating one of the nodes to act as a master clock for the cluster 200. That is to say one of the nodes 210 provides a reference clock (i.e. the master clock) to which the other nodes can synchronize. The other nodes can then synchronize to the master clock provided by that node. This means that the nodes of the cluster 200 do not require access to a reliable external clock (such as GPS or an atomic clock) which can be expensive to be provide. In some examples, the configuration protocols for the cluster 200 may dictate that management of the configuration of the cluster 200 and the provision of a master clock are performed by the same master node 210 (that is the configuration master node and the master node for providing the master clock are the same).

In the context of providing a master clock for the cluster 200, the node 210 that provides the master clock may be referred to as the master node 210, whilst the other nodes may be referred to as slave nodes (although, in the context of other functions that may be performed within the cluster 200, other nodes 210 might be considered to be the master node).

As will be appreciated, local timestamps that are generated by the slave nodes will inevitably be approximations of the master clock even when they are regularly synchronized with the master clock. This is due to a couple of factors. Firstly, there is some timing uncertainty that is introduced by the processing that is performed by each node in generating/handling the remote timestamp, in addition to the timing uncertainties that are introduced in the transmission of the timestamp across the network from the master node to the slave node. This means that the remote timestamp will inevitably represent a prior point in time than the point in time that it is received by the slave node. Secondly, each node 210 makes use of local clocks provided within their respective processors 102. Due to the differences between the clock speed (or oscillations) within each processor, the local clocks 230 will suffer from the phenomenon of clock drift relative to the other clocks in the cluster 200. This phenomenon means that even if two clocks in the cluster started with the same values at the same point in time, the values of those clocks would diverge over time due to one of the clocks running faster than the other. This potential difference between the values of the local clocks on each of the slave nodes and the master clock of the master node can be encapsulated in a measure of uncertainty which is maintained by each of the slave nodes. The measure of uncertainty provides an indication of the potential difference that could exist between a particular timestamp produced by the local clock of a slave node (which may be referred to as a local timestamp) and a timestamp produced by the master clock (which may be referred to as a master timestamp). In particular, the measure of uncertainty provides an indication of both the minimum and maximum values that the remote master clock could be at the point in time which a local timestamp is measured from the local clock. This is needed for certain applications which may run on the cluster 200 (such as the distributed transactional memory systems discussed below), which require a guarantee that master clock will not be greater than (or in other situations less than) a particular value at a given point in time. That is to say, certain application require a guarantee that none of the clocks of the nodes in the cluster will have a value which falls outside the range indicated by the measure of uncertainty for the local clock of each node.

In the examples discussed herein, the clocks are incremented with the passage of time. That is to say, a lower value of clock represents an earlier point of time than a higher value of clock. Therefore, a maximum value of the master clock represented by the measure of uncertainty will be a value that is greater than the local timestamps provided by the local clocks and a minimum value of the master clock represented by the measure of uncertainty will be a value that is lower than the local timestamps. However, it will be appreciated that the clocks may start at a high value and be decremented with the passage of time. In such examples, a higher clock value represents an earlier point of time than a lower value of clock. Similarly, a maximum value of the master clock represented by the measure of uncertainty will be a value that is lower than the local timestamps provided by the local clocks and a minimum value of the master clock represented by the measure of uncertainty will be a value that is higher than the local timestamps. In either case, the minimum value of the master clock can be considered to be how much earlier the time indicate by the master clock could be compared to the value of the local clock whilst the maximum value of the master clock can be considered to be how much later the time indicated by the master clock could be compared to the value of the local clock.

Figure 3:
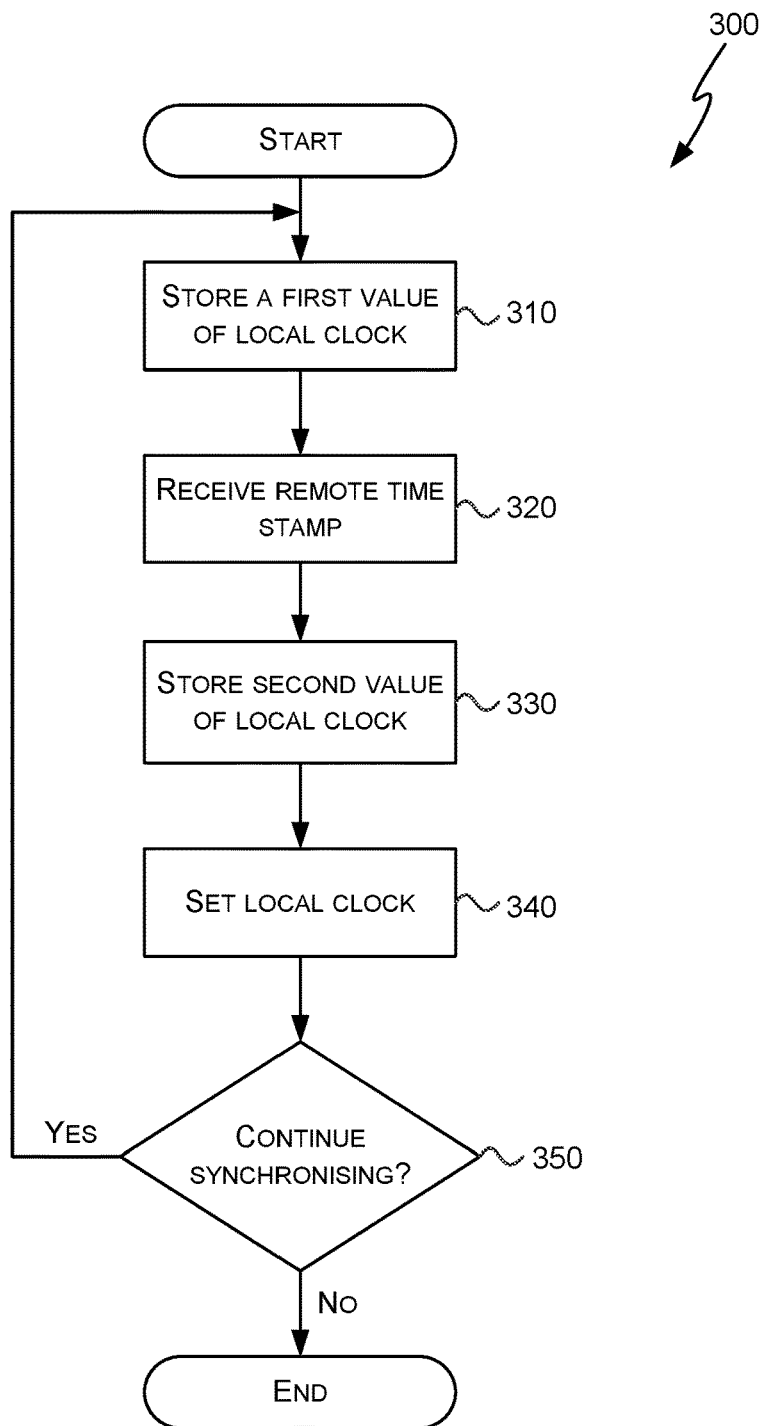
FIG. 3 illustrates an exemplary method that is performed by slave nodes to synchronize their local clocks to a master clock.

FIG. 3 illustrates a method 300 that is performed by the slave nodes 210 to synchronize their local clocks 230 to the master clock provided by the master node 210.

At an operation 310, the method 300 stores a first value representing the current value of the local clock.

At an operation 320, the method 300 receives a remote timestamp (or master timestamp) indicating a current value of the remote clock from the master node 210, the remote clock of the master node 210 functioning as the master clock for the cluster.

At an operation 330, the method 300 stores a second value representing the current value of the local clock 230 at the time that the remote timestamp was received. The second value stored at operation 330 represents a point in time that is known to be later than the time that the remote timestamp was generated (i.e. when the remote timestamp was received).

The first value stored at operation 310 represents a point in time that is known to be earlier than the time that the remote timestamp was generated. In some examples, the slave nodes may send a synchronization request to the master node requesting the remote timestamp. In such examples, the first value may represent the point in time that the request was sent to the master node. In other examples, the master node may periodically send the remote timestamp to the slave nodes. In such examples, the first value may represent the timestamp at which a previous synchronization message was received. In yet other examples, a hybrid approach may be taken with the master node periodically sending the remote timestamp and the slave nodes sending synchronization requests as needed. It is desirable, in order to minimize the uncertainty around the master clock value at the slave node, for the first value to represent the latest point in time which is known to have occurred before the remote timestamp was generated.

At an operation 340 the method 300 sets the local clock 230 to the current value of the remote clock based on the remote timestamp. The value of the local clock will therefore approximately represent the value of the remote clock (within the bounds of the above-discussed uncertainties).

It will be appreciated that setting the value of the clock 230 is an abstract operation and does not involve changing the actual value of the clock. Instead, information is stored from the synchronization operations which allows timestamps to be generated from the clock such that they approximately represent the value of the master clock. As an example, setting the value of the clock 230 may be achieved by changing an offset value stored at the slave node representing the difference between the local clock value and the master clock (as indicated by the master timestamp). In such examples, the offset value is used to adjust the value of the local clock when local timestamps are generated.

At an operation 350, if it is determined that synchronization should continue, the method 300 returns to operation 310. Otherwise the method 300 ends.

Figure 4:
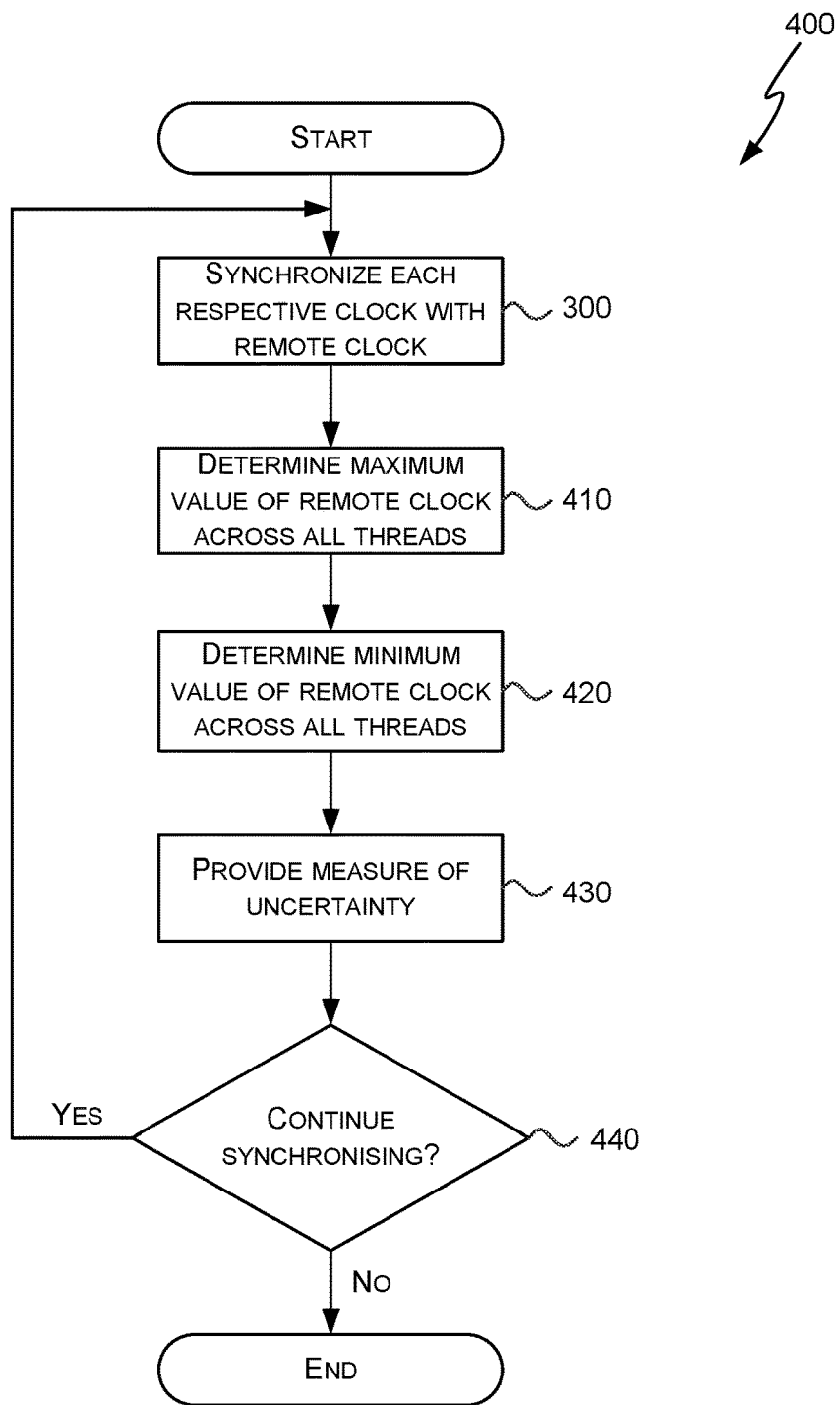
FIG. 4 illustrates an exemplary method for synchronizing two or more local clocks on a slave node with a master clock.

FIG. 4 illustrates an exemplary method 400 for synchronizing two or more local clocks on a slave node 210 with a master clock 230. Each of the local clocks is provided by a respective clock 106 associated a different processing core 104 of the processor 102 of the slave node 210. Each of the local clocks is synchronized by a thread (or, in some examples, multiple threads) associated with the processing core 104 to which that clock belongs. These threads may be referred to as synchronization threads. Each of the synchronization threads carries out the method 300 described above with reference to FIG. 3 to synchronize the clock 106 of the processing core 104 upon which they are being processed.

At an operation 410, the method 400 uses the first values that were stored by each thread to determine a respective maximum value of the remote clock for each thread. The respective maximum value of the remote clock is determined based on the remote timestamp that was received and a pre-determined maximum rate of clock drift between the slave node's local clock and the remote master clock, as well as an amount of time elapsed between the present time and the first stored value. Specifically, the time elapsed since the first value (which is the earlier of the two stored values) was stored can be calculated and multiplied by the maximum rate of clock drift to calculate the maximum amount of clock drift that may have occurred since the remote timestamp was received. This clock drift is then added to the remote timestamp to determine the maximum value that the master clock could be at that point in time.

At an operation 420, the method 400 uses the second values that were stored by each thread to determine a respective minimum value of remote clock for each thread. The respective minimum value of the remote clock is determined based on the remote timestamp that was received and a pre-determined minimum rate of clock drift between the slave node's local clock and the remote master clock, as well as an amount of time elapsed between the present time and the second stored value. Specifically, the time elapsed since the second value (which is the later of the two values) was can be calculated and multiplied by the minimum rate of clock drift that may have occurred since the remote timestamp was received. This clock drift is then added to the remote timestamp to determine the minimum value that the master clock could be at that point in time.

In some examples, the minimum and maximum values of the remote clock may be determined for each thread by the threads themselves. Alternatively, in other examples, these determinations may be performed by other processes running on the slave node 210.

Having determined the minimum and maximum values based on the synchronizations that have been performed by each thread, the method 400 consolidates these values into a single minimum and maximum value of the remote clock for the slave node 210 as a whole. In particular, the method 400 selects a lowest (i.e. earliest) maximum value of the remote clock from amongst the maximum values determined for each thread. Similarly, the method 400 selects a largest (i.e. latest) minimum value of the remote clock from amongst the minimum values determined for each thread.

At an operation 430, the method 400 provides an indication of the lowest maximum value and largest minimum value as a measure of uncertainty for the local timestamps provided by each of the respective local clocks on the slave node. By consolidating the minimum and maximum values in this manner from across multiple threads, a better, more accurate, measure of uncertainty can be provided for the remote clock at the slave node 210. This is because the different threads on the different processing cores 104 may achieve better synchronization with the remote clock. This could be, for example, due to one or more of the threads running slowly. In some examples, one or more of the synchronization threads receives the remote timestamp from the master node via a different communication protocol to a communication protocol used by the other threads. Since different communication protocols may be better suited to different network conditions, one of the communication protocols may provide a better synchronization than the other for a given set of network conditions being encountered by the slave node. Additionally, or alternatively, in other examples, one or more of the synchronization threads may receive the remote timestamp via a different communication medium to that used by the other threads. Since the different communication mediums have different properties, the synchronization to the master clock may be performed more effectively via one of the communication mediums than another. The lowest maximum value and largest minimum value may be respectively provided by two different synchronization threads. Any synchronization threads which are determined not to contribute to the lowest maximum value and largest minimum value may be stopped, such that the synchronization continues using only those threads that are synchronizing most effectively. Any local clocks which are not being directly synchronized to the master clock by a respective synchronization thread can be synchronized instead to one of the other local clocks (using specified tolerances for internal clock drift between the clocks 106 of different cores 104 within the processor 102).

In some examples, the slave node may monitor the actual rate of clock drift that it experiences relative to the master clock and, if the actual rate of clock drift exceeds the predetermined minimum or maximum rates of clock drift may leave (i.e. cease to participate in) the cluster 200. This is determined by looking at the stored values from two separate synchronizations with the master clock. In particular, the range between the first stored value of the earlier synchronization and the second stored value of the later synchronization is calculated as a maximum clock difference between the two synchronizations and the range between the second stored value of the earlier synchronization and the first stored value of the later synchronization is calculated as a minimum clock difference. If the time between the two synchronizations divided by the calculated maximum clock difference exceeds the predetermined maximum rate of clock drift, or if the time between the two synchronizations divided by the minimum clock difference is less than the predetermined minimum rate of clock drift, the actual rate of clock drift is considered to exceed the predetermined minimum or maximum rates of clock drift. In some examples, the predetermined minimum and maximum rates of clock draft may be adjusted by a safety factor during this determination to ensure that the clock drifts fall safely within the bounds specified by the predetermined minimum and maximum rates of clock drift.

At an operation 440, the method 400 may reiterate to carry out further synchronizations. Since the amount of clock drift is dependent upon the time that elapses between synchronizations, it is desirable for the method 400 to repeat regularly so that the time between any two synchronizations remains low.

Figure 5:
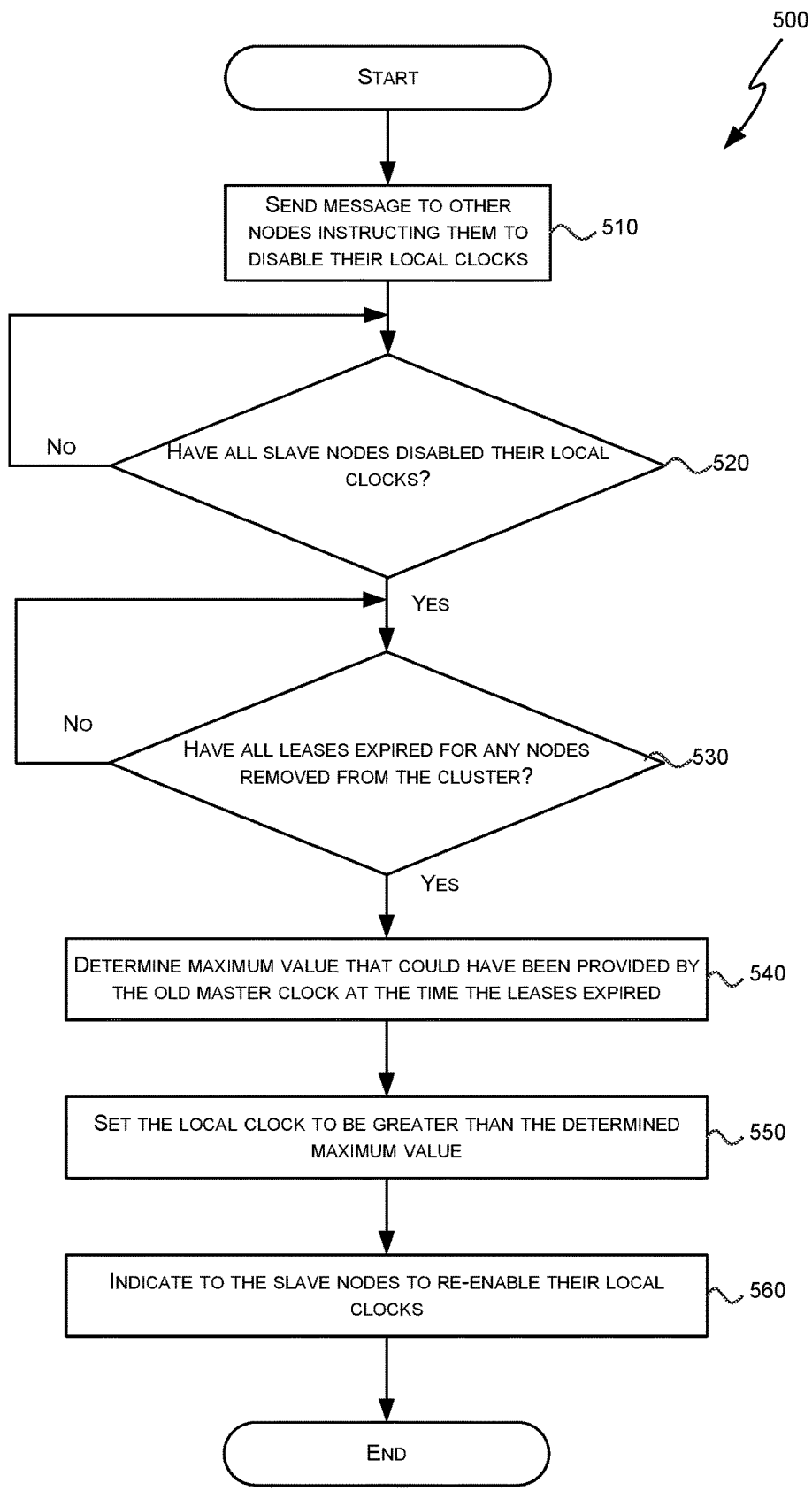
FIG. 5 illustrates an exemplary method to be performed by a new master node of the cluster to establish a master clock following a reconfiguration of the cluster.

FIG. 5 illustrates an exemplary method 500 to be performed by a new master node 210 of a cluster 200 of nodes to establish a master clock by using its local clock. This method 500 is performed following a reconfiguration of the nodes 210 included in the cluster. Prior to the reconfiguration, the master clock was provided by an old master node 210 to which the other nodes 210 in the cluster 200 synchronized their local clocks 230. In some examples, the reconfiguration of the cluster 200 involves the addition and/or removal of nodes 210 from the cluster 200. For example, the old master node 210 may have been removed from the cluster 200, necessitating the establishment of a new master clock. Of course, in other examples, the reconfiguration of the cluster may nominate the new master node 210 to provide the master clock for the cluster 200 even though the old master node 210 hasn't been removed. In some examples, the new master node 210 may be a node 210 that has been added to the cluster 200. That is to say, the new master node 210 may not have been present in the cluster of nodes prior to the reconfiguration. In general the term 'old' is intended to indicate a particular node which is performing a particular role prior to a reconfiguration of the cluster whilst the term 'new' is intended to indicate a particular node which is performing the particular role after a reconfiguration of the cluster.

At an operation 510, the method 500 sends a message to the other nodes in the cluster of nodes instructing them to disable their respective local clocks. With their local clocks disabled, the other nodes will cause any processing that requires timestamps from the local clock (e.g. transactions in a distributed memory) to be paused.

At an operation 520, the method 500 waits until it has received acknowledgements from all of the other nodes in the cluster of nodes indicating that their respective local clocks have been disabled.

At an operation 530, the method 500 identifies a time at which all leases of any nodes 210 which have been removed from the cluster 200 of nodes by the reconfiguration will have expired and waits until that identified time has passed. Since these nodes 210 are no longer in the cluster 200 following the reconfiguration, they will not have received instructions to disable their local clocks and will continue any processing (e.g. transactions in a distributed memory) that had received prior to the reconfiguration including obtaining timestamps from their local clocks. Following the expiry of their lease, these nodes 210 will no longer be able to interact with the cluster 200 meaning that no timestamps from these nodes after this point will be able to be present in the cluster 200.

At an operation 540, the method 500 determines a maximum value that the master clock provided by the old master node 210 could have been at the time that the leases of the nodes 210 removed from the cluster 200 expired. This value is the maximum value that could have been provided by the local clocks of those nodes up until the point of the expiry of their leases. In some examples, this maximum value may be determined by simply adding a relatively 'large' predetermined amount onto the previous master clock. This 'large' amount may be an order of magnitude or more larger than the scale of normal operations on the clock to ensure that it is highly likely to be larger than any timestamps that may have been previously issued by nodes 210 in the cluster 200. However, in other examples, the nodes 210 of the cluster 200 maintain measures of uncertainty as to their synchronization with the old master clock, as described earlier. These measures of uncertainty indicate a maximum value of the master clock based on a predetermined maximum rate of clock drift and an amount of time elapsed since the last synchronization of that node 210 with the master clock. The new master node 210 may therefore determine the maximum value of the old master clock at the time the leases expire to be the maximum (i.e. most recent) value indicated by any of the nodes that remain in the cluster following the reconfiguration (and which were therefore synchronized to the old master clock). In some examples, the nodes may provide an indication of the maximum value of the master clock together with an acknowledgement that their local clocks have been disabled following receipt of the message sent in operation 510. This reduces the number of messages which need to be sent between the nodes 210 in the cluster 200.

At an operation 550, the method 500 sets its local clock to be greater than the maximum value, effectively 'jumping' the master clock forward to a guaranteed 'new' value for the cluster. As discussed earlier, the 'setting' of the local is an abstract operation which affects the timestamps generated by the clock, not the actual underlying value of the clock itself. It is advantageous for this 'jump' to be as small as possible, whilst still guaranteeing that no timestamps will have already been issued indicating a time occurring after the new master clock value. This is because, when time is represented in a computer system as a fixed number of bits, there is only a certain range of time that can be represented. By keeping the 'jumps' minimal, it maximizes the amount of time available before a master clock overflow occurs.

At an operation 560, the method 500 indicates to the slave nodes 210 that their local clocks 230 can be re-enabled. This means that the slave nodes 210 will synchronize to the new master clock and continue any processing that may have previously been paused with the local clock was disabled. In some examples, the master node 210 may send a message to the slave nodes explicitly instructing them to re-enable their local clocks 230. In other examples, the indication may be given implicitly. For example, the slave nodes 210 may be arranged to periodically attempt re-synchronization of their local clocks 230 with the new master node 210 after they have been disabled. The indication to re-enable the clocks may therefore be provided by the new master node 210 by starting to respond to the synchronization requests from the slave nodes 210 (where previously the master node 210 did not respond to those requests or responded with an error).

Figure 6:
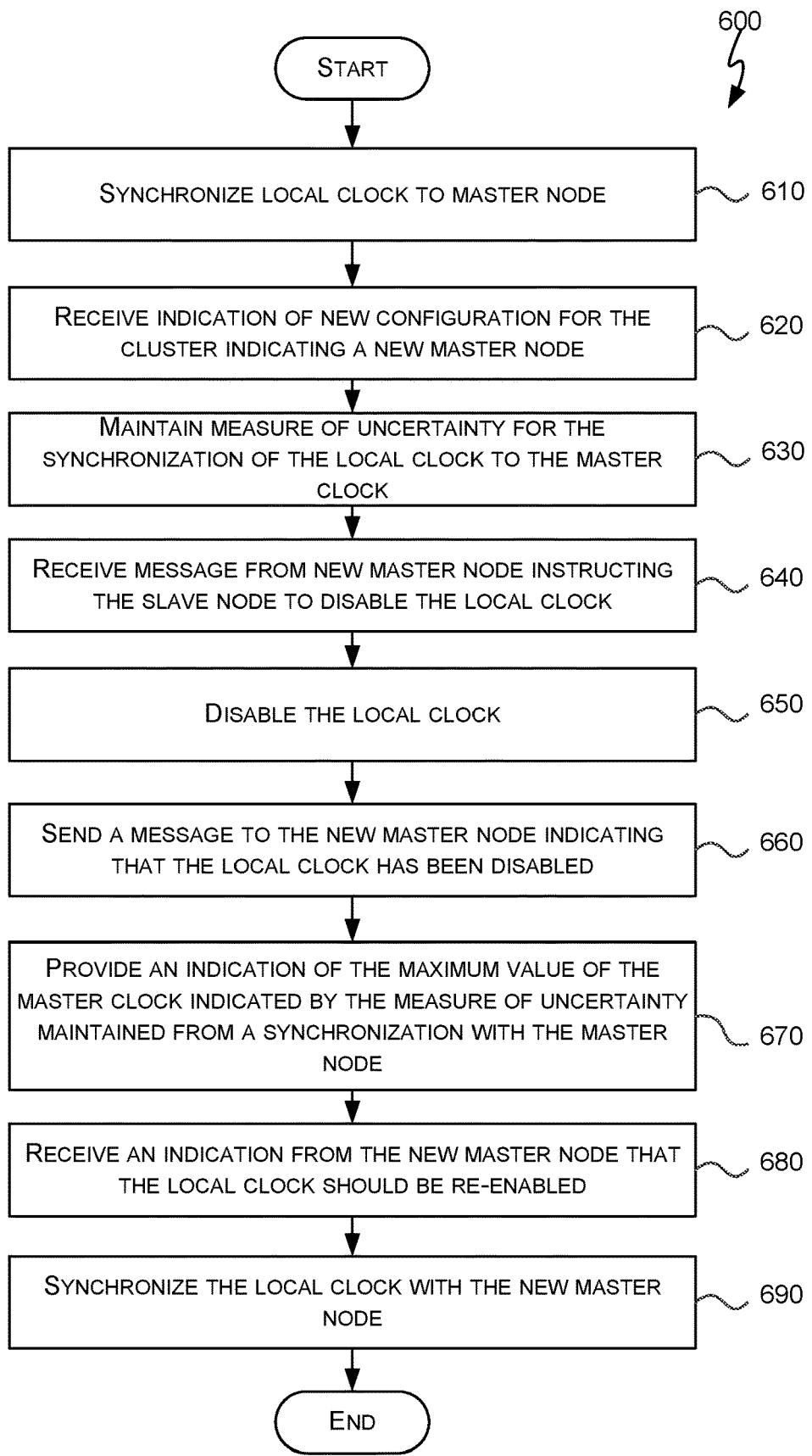
FIG. 6 illustrates an exemplary method to be performed by a slave node of the cluster to synchronize its local clock to a master clock.

FIG. 6 illustrates an exemplary method 600 to be performed by a slave node 210 of a cluster 200 of nodes to synchronize its local clock to a master clock provided by a master node of the cluster of nodes.

At an operation 610, the method 600 synchronizes the local clock to the master node of the cluster 200. This synchronization may be performed in the manner described above in relation to FIG. 3 and FIG. 4 (i.e. with or without the use of multiple local clocks and threads).

At an operation 620, the method 600 receives an indication of a new configuration for the cluster, the new configuration 210 indicates a new master node 210 for the cluster 200. The indication of the new configuration may be indicated using an existing configuration protocol for the cluster 200.

At an optional operation 630, the method 600 maintains a measure of uncertainty for the synchronizations that were performed with the master node prior to the reconfiguration of the cluster 200 (i.e. the previous master node). This measure of uncertainty indicates a maximum value of the master clock (that is, the previous master clock) based on a predetermined maximum rate of clock drift and an amount of time elapsed since the last synchronization with the master clock (again, that is the previous master clock).

At an operation 640, the method 600 receives a message from the new master node instructing the slave node to disable the local clock. In some examples, the message is implicitly provided. That is to say, the disablement of the clock may be performed by the slave node in response to receiving an indication of a new configuration in which a new node is providing the master clock.

At an operation 650, the method 600 disables the local clock. Disabling the local clock 230 means that the slave node 210 ceases to provide timestamps for any processing that is being performed. Where the processing being performed requires a timestamp, the disabling of the local clock 230 therefore results in that processing being paused until the local clock 230 is re-enabled and a timestamp can be obtained.

At an operation 660, the method 600 sends a message to the new master node 210 indicating that the local clock 230 has been disabled.

At an optional operation 670, the method 600 provides an indication of the maximum value of the previous master clock from the measure of uncertainty maintained at operation 620 to the new master node 210. In some examples, this indication is included in the message that is sent at operation 650 indicating that the local clock 230 has been disabled that is sent in operation 640.

At an operation 680, the method 600 receives an indication from the new master node 210 that the local clock should be re-enabled. In some examples, the slave node may periodically attempt to synchronize to the master node 210. The indication that the local clock should be re-enabled is received when the master node 210 responds to one of the synchronization attempts with a timestamp for the new master clock. In other examples, the indication may simply be a message indicating that the local clock 230 should be re-enabled, following which the slave node 210 may start attempting to synchronize, at an operation 690, to the new master clock provided by the new master node 210. With the clock re-enabled and synchronized to the new master clock, any processing that is allocated to the slave node 210 requiring timestamps may be resumed.

In some examples, the messages required for synchronization between slave nodes 210 and a new master node, such as the message instructing the slave node to disable the local clock, the message from the slave node indicating that the local clock has been disabled and the indication from the new master node 210 to the slave node 210 that the local clock 230 should be re-enabled are provided by inserting additional information into existing messages used as part of the configuration protocol for the cluster. This reduces the need to send additional messages between the nodes 210 in the cluster 200 to synchronize local clocks to the master clock.

Through the above-described techniques, the cluster 200 of nodes can allow applications to synchronize actions across the nodes 210 of the cluster 200 without requiring expensive external resilient (or reliable) clocks such as GPS or atomic clocks. Furthermore, even though the node providing the master clock within the cluster 200 may fail, the cluster 200 can re-synchronize the master clock from a new master node in a way which guarantees integrity of the time-line for actions within the cluster. The properties provided by these techniques are useful for a wide range of applications that may run on the cluster 200. One example of an application that requires such features is a distributed transactional memory system.

A distributed transactional memory system is an example of an application which may run on the cluster 200 of nodes. The distributed memory system stores objects on the nodes 210 within the cluster and provides a single global address space for accessing those objects (i.e. a single address space for all of the objects stored in the distributed memory system, regardless of which node 210 they currently reside on). This enables objects to be accessed without needing to know which of the nodes 210 the objects reside on.

In some examples, the distributed memory system replicates the objects that are stored between the nodes 210 of the cluster 200, such that identical copies of a particular object are stored by at least two nodes 210 in the cluster 200. In such examples, one of the copies may be identified as being the primary or authoritative copy of the object, whilst the others are identified as being backup copies. By replicating copies of the objects, the distributed memory system may continue operating in the event that one or more of the nodes 210 of the cluster 200 become unavailable (such as for example, due to hardware failure) without any loss of data.

Transactions to read and/or write data to the distributed memory system are also distributed amongst the nodes 210 of the cluster 200 and performed in parallel. This provides scalability for the distributed memory system, allowing greater throughput of transactions. However, it is necessary to ensure the correct serialization of the transactions (and in some cases strict serialization) when they are performed in parallel by different nodes 210 of the cluster 200.

Figure 7:
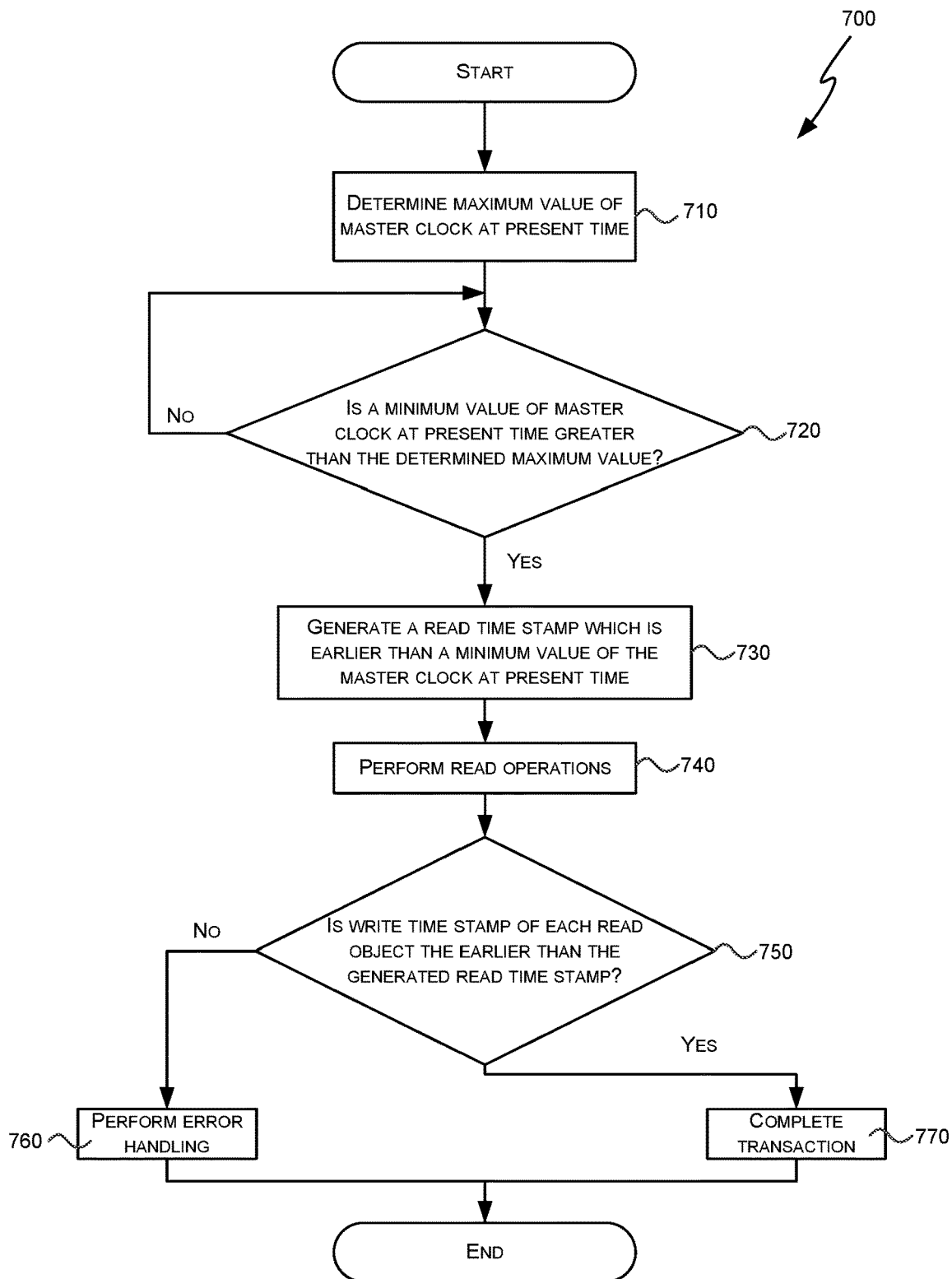
FIG. 7 illustrates an exemplary method for performing a transaction which includes one or more read operations within a distributed transactional memory system operating on the cluster of nodes.

FIG. 7 illustrates an exemplary method 700 for performing a transaction which includes one or more read operations within a distributed transactional memory system operating on the cluster 200 of nodes.

At an optional operation 710, the method 700 determines a maximum value of the master clock at the present time. In some examples, this is achieved by referring to a measure of uncertainty for the master clock which is maintained by the node 210 (as discussed above in relation to FIG. 3 and FIG. 4). However, in other examples, different techniques are used, such as assuming a predetermined 'large' value for the errors in clock synchronization (which is not based on a time elapsed since a last synchronization).

At an optional operation 720, the method 700 waits until the current minimum value of the master clock, as indicated by the measure of uncertainty, is after (i.e. later) than the maximum value determined in operation 710.

The optional operations 710 and 720 together enable the method 700 to provide strict serialization of read transactions. However, in some examples, optional operations 710 and 720 are not performed the method 700 starts at an operation 730. Even if operations 710 and 720 are not performed, the method 700 still guarantees the correct serialization of read transactions (but not strictness).

At operation 730, the method 700 generates a read time stamp which is earlier than a minimum value of the master clock at the present time. When optional operations 710 and 720 are performed, the generated read time stamp is also after (or equal to) the maximum value of the master clock that is determined in operation 710. This read time stamp indicates the point in time at which the read transaction is considered to occur, which will be earlier than any possible current timestamps which may be provided by any of the nodes 210 in the cluster 200. The read timestamp may also determine which version of an object is read where the memory system is a multi-version memory system, as discussed further below.

At an operation 740, the method 700 reads the objects from the respective nodes 210 of the cluster 200 upon which they reside. In some examples, the objects may be read using Remote Direct Memory Access (RDMA) such that the processor of the node 210 upon which an object lies is not involved in reading the object. Each of the objects that is read is associated with a timestamp indicating when the object was created (that is the write timestamp of a transaction which wrote the object).

At an operation 750, the method 700 verifies that the timestamp associated with each of the objects is earlier than the read timestamp for the transaction. If any of the timestamps associated with the read objects represents a time which is after the read timestamp, this means that the object has already been written to by a subsequent transaction.

Therefore, at an operation 760, if any of the timestamps associated with the read objects indicates a time that is after the read timestamp, the method 700 performs error handling for the read transaction, as invalid result would be provided if the transaction were to complete using the read objects. In some examples, the error handling simply involves aborting the transaction. In other examples, the error handling involves attempting to find a previous version of the object in the form that it existed at the time indicated by the read timestamp for the transaction. The transaction may then be completed using the previous version of the object. This is discussed in more detail below in relation to FIG. 10 below which provides a method for reading a particular version of object and can be used to find the version of the object as it existed at the time of the read timestamp for the transaction.

However, if none of the timestamps associated with the read objects is later than the read timestamp, the method 700 proceeds to complete the read transaction using the objects that have been read.

Figure 8:
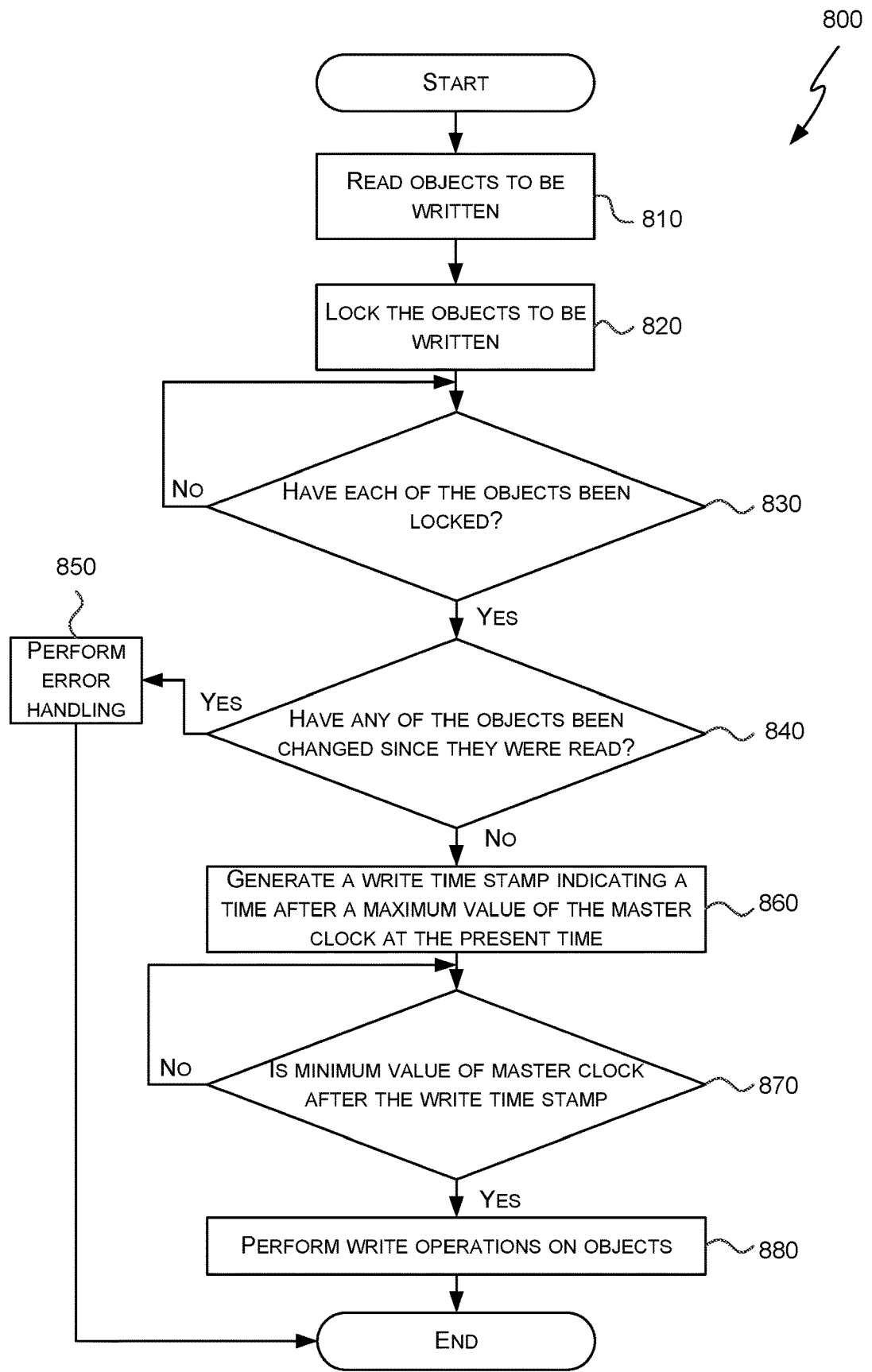
FIG. 8 illustrates an exemplary method for performing a transaction which includes one or more write operations within the distributed transactional memory system operating on the cluster of nodes.

FIG. 8 illustrates an exemplary method for performing a transaction which includes one or more write operations within the distributed transactional memory system operating on the cluster 200 of nodes.

At an operation 810, the method 800 reads the objects to be written. As discussed in relation to FIG. 7, RDMA reads may be used to read the objects residing on other nodes 210 in the cluster 200. In reading the objects to be written, the operation 810, in some examples, creates a temporary copy of the object upon which to stage the write operations prior to completion of the transaction.

At an operation 820, the method 800 locks each of the objects which are to be written. Any conventional technique for locking the objects may be used.

At an operation 830, the method 800 the method waits until each of the objects has been locked. Once the objects are locked, other transactions operating on the objects after this point will see the locks and be able to determine that the objects may be about to be written to, even if the other transactions are processed before this transaction is committed.

At an operation 840, the method 800 checks whether any of the objects to be written to have changed since they were read and locked. This is achieved by checking that the timestamp associated with each object has not changed since it was read at operation 810.

If any of the objects has changed since it was read at operation 810, the method 800 performs error handling at an operation 850 and aborts the transaction.

Otherwise, if none of the objects has changed since they were read at operation 810, the method 800 generates a write timestamp for the transaction at an operation 860. The write timestamp represents a point in time at which the transaction is considered to occur. The write timestamp is generated such that it is after a maximum value of the master clock at the point in time that all of the respective objects to be written have been locked. This can be determined using a measure of uncertainty maintained at the node 210.

At an operation 870, the method 800 waits until a current minimum value of the master clock (as indicated by the measure of uncertainty maintained by the node) is after the write timestamp.

At an operation 880, the method 800 performs the write operations on the objects to be written to, thereby completing the transaction.

By generating the write timestamp in this way (such that the write is definitely in the future relative to the master clock at the time the locks are obtained) and then waiting until the write timestamp is definitely in the past relative to the master clock (using the measure of uncertainty), the correct serialization of transactions between the nodes 210 in the cluster 200 can be guaranteed.

It will be appreciated that the method 800 illustrated in FIG. 8 may be combined with the method 700 illustrated in FIG. 7 to process transactions comprising both read and write operations. In doing so, an additional check is performed to verify to check that objects which have been read (but not written to) have not been changed since the read timestamp. This check is in addition to the check performed during execution at operation 750 of method 700. This additional check occurs just before operation 880 of FIG. 8 (i.e. after waiting for the current minimum value of the master clock to be later than the write timestamp). Therefore, for objects which are read but not written to, two checks are performed to check that the objects have not changed, one performed during execution of the transaction and one immediately prior to the transaction being committed.

The methods described above in relation to FIGS. 7 and 8 allow optimistic concurrency control to be used in a distributed transactional memory system. This means that it is possible to benefit from the use of Remote Direct Memory Access (RDMA) reads to read objects residing on one node 210 at another node 210 in the cluster 200, since the use of RDMA reads prevents the use of pessimistic concurrency control. The use of RDMA reads to access objects helps to improve the speed with which objects can be accessed by nodes 210 within the cluster and helps prevent bottlenecks (since a remote note 210 can read an object residing on another node 210 without involving the processor of the other node 210).

In some examples, the distributed transactional memory system is a multi-version memory system. This means that the memory system may store previous versions of the objects that it stores. Each of the previous version of the objects is associated with a version timestamp indicating the time when that version of the object was initially created (i.e. the write timestamp of the transaction which created that version of the object, not the write timestamp of the transaction which overwrote it).

Figure 9:
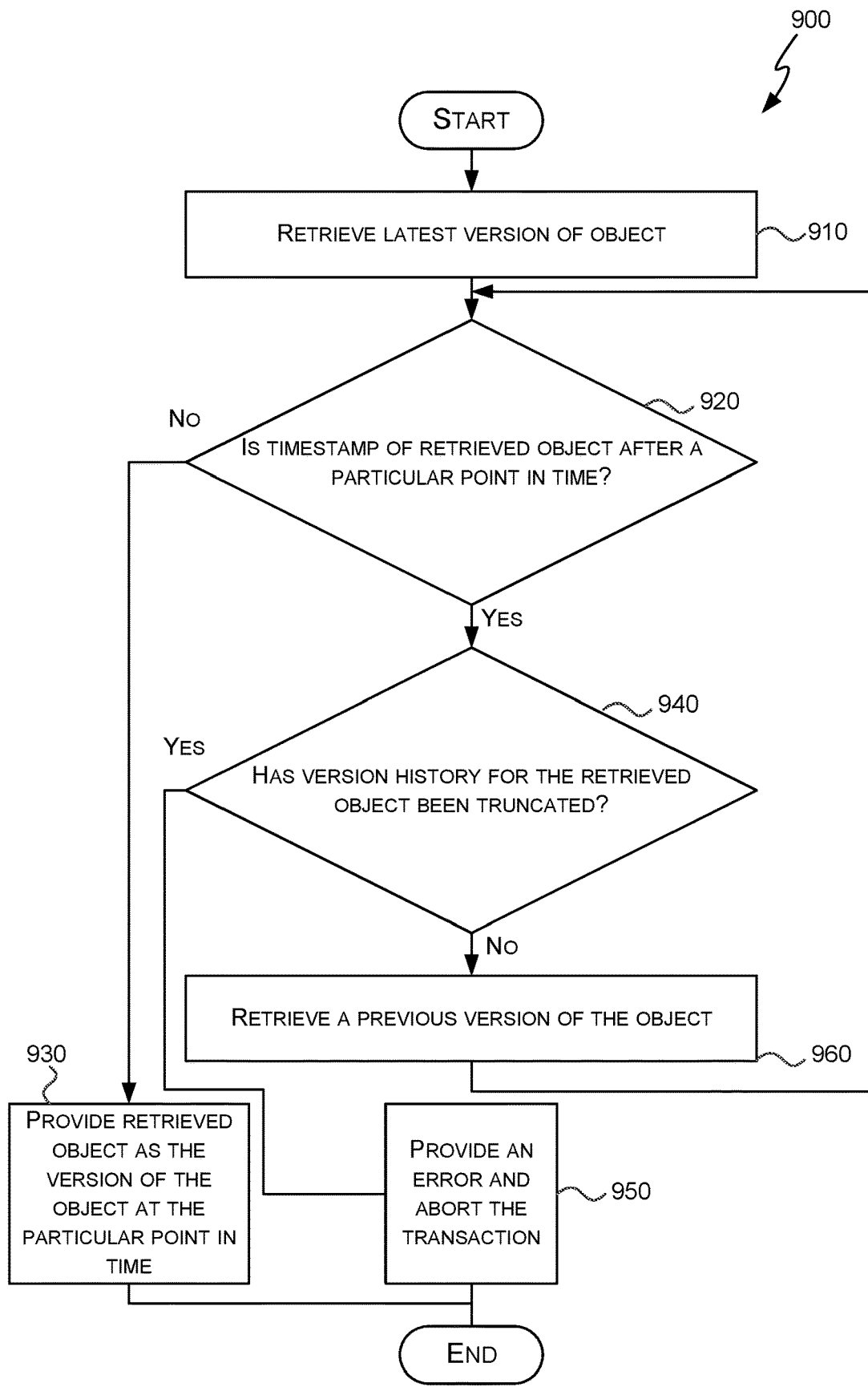
FIG. 9 illustrates an exemplary method for performing a read transaction in a multi-version transactional memory system.

FIG. 9 illustrates an exemplary method 900 for performing a read transaction in a multi-version transactional memory system. The read transaction may require a particular version of the object to be read. The particular version represents the object as it existed at a particular point in time. Specifically, the read transaction has a read timestamp associated with it, requiring the version of the object as it existed at the point in time indicated by the read transaction to be read.

At an operation 910, the method 900 retrieves the latest version of the object from the memory system. The memory that is allocated in each node 210 for storing the current versions of objects may be separate from the memory that is allocated for storing previous versions of the objects.

At an operation 920, the method 900 determines whether the version timestamp of the retrieved version of the object is older than the read timestamp. If it is, then that version of the object is the version of the object that existed at the time indicated by the read timestamp and that version of the object is provided, at an operation 930. Otherwise, an older version of the object is needed.

At an operation 940, the method 900 determines whether the version history for the retrieved object has been truncated. In some examples, each version of the object is associated with a pointer indicating a memory address of a previous version of the object. In such examples, a null pointer value indicates that the version history has been truncated. However, in other examples, different techniques for indicating the truncation of the version history (such as using a bit flag in a memory allocation table) are used instead.

If the version history has been truncated, then an error is encountered as a previous version of the object is required for the transaction, but is not available. Accordingly, at an operation 950, the method 900 aborts the read transaction.

However, if the version history has not been truncated, the method 900 proceeds to retrieve the previous version of the object at an operation 960. This is achieved, for example, by following a pointer associated with the current version of the object which indicates the memory location of the previous version. The method reiterates back to operation 920 to assess whether the previous version is the version of the object needed for the read transaction.

Figure 10:
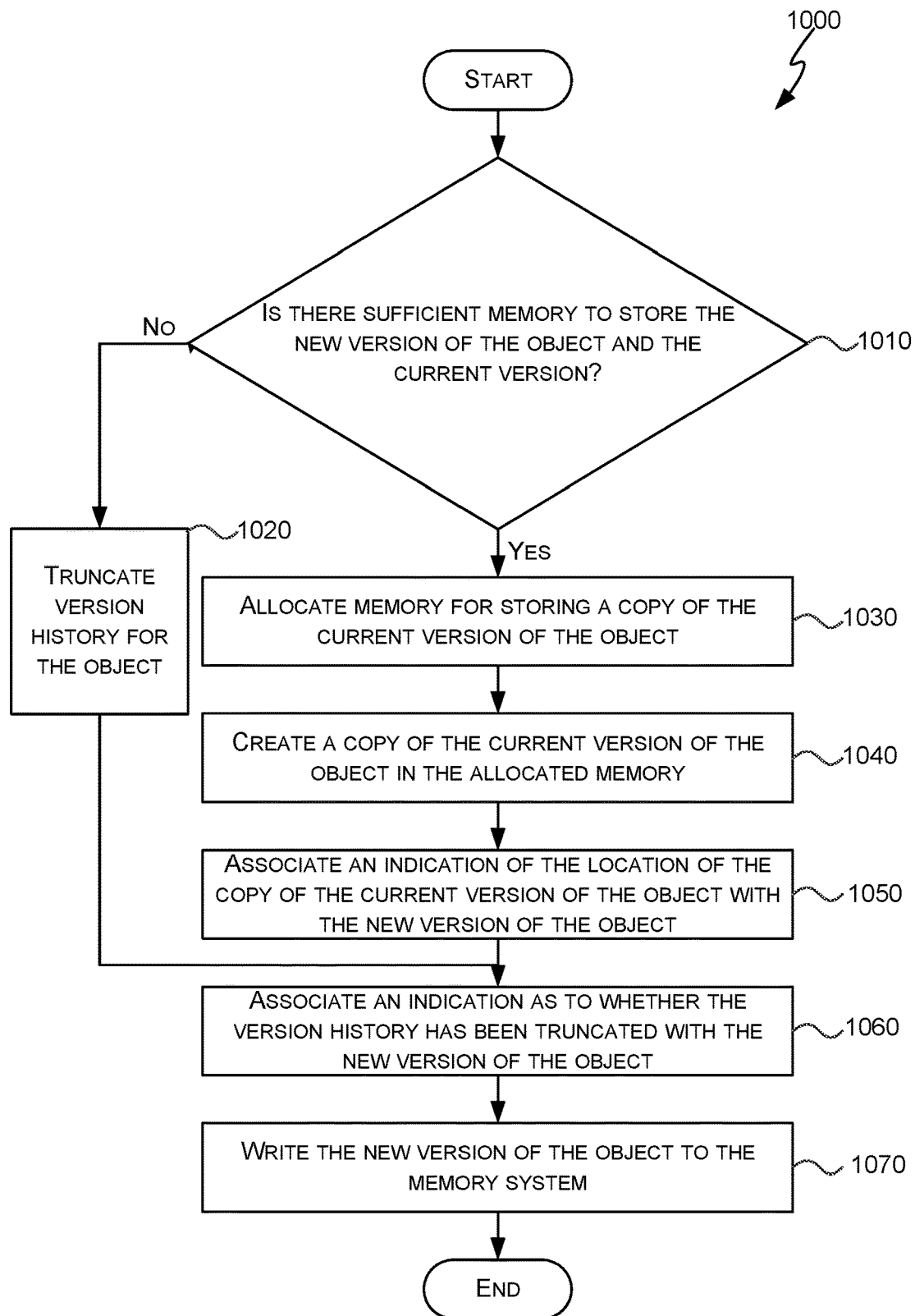
FIG. 10 illustrates an exemplary method for performing a write transaction in a multi-version transactional memory system.

FIG. 10 illustrates an exemplary method 1000 for performing a write transaction in a multi-version transactional memory system.

At an operation 1010, the method 1000 determines whether there is sufficient memory to storing both the new version of the object and a current version of the object. In some examples, the memory allocated for storing current versions of objects is different from the memory allocated for storing the previous versions. Therefore, determining whether there is sufficient memory involves determining whether there is sufficient space in the memory allocated for storing the previous versions for storing a copy of the current version of the object and determining whether there is sufficient space in the memory allocated for storing the new version by overwriting the current version.

If there is not sufficient memory to store both versions of the object, the method 1000 truncates the version history for the object at an operation 1020. In some examples, each version of an object in the multi-version memory system is associated with a pointer which indicates a memory location at which a previous version of the object is stored. In such examples, truncating the version history for the object is achieved by setting this pointer to be null in the new object.

Otherwise, if there is sufficient memory to store both versions of the object, the method 1000 allocates memory for storing a copy of the current version of the object at an operation 1030. The method then creates a copy of the object in the allocated memory at an operation 1040, and associates an indication of the location of the copy of the current version of the object with the new version of the object which is to be written. In some examples, this indication is provided by a pointer.

At an operation 1060, the method 1000 associates an indication as to whether the version history has been truncated with the new version of the object. This indication could be provided for example, by setting a flag associated with the object to an appropriate value. Alternatively, this indication could be provided through the same pointer that is used to indicate the location of the current (soon to be previous) version of the object. Specifically, the pointer may be set to null to indicate that the version history has been truncated and any other value to indicate that the version history has been maintained.

At an operation 1070 the method 1000 writes the new version of the object to the memory system, thereby replacing the current version. In some examples, the new version of the object is overwritten over the current version of the object (i.e. such that it occupies the same memory address). The previous version of the object is then provided by the copy (at a new memory address). This is advantageous when Remote Direct Memory Access (RDMA) reads are used to access objects residing on one node by another node because it means that the global address for the current versions of the objects remains unchanged. However, other examples (such as those not utilizing RDMA reads to read the objects) may write the new version of the object to freshly allocated memory (having a different memory address to the current version of the object).

In some examples, the methods 900 and 1000 are performed in combination with the methods described above in conjunction with FIG. 7 and FIG. 8 for performing transactions involving reading and writing operations respectively. However, in other examples, the methods 900 and 100 may be performed independently from these methods 700 and 800. In either case, the methods 900 and 1000 provide the ability for write operations to proceed even where there is not enough space to store a copy of the previous version of an object. This means that it is not necessary for the write operation to wait until sufficient space to store a copy becomes available. Instead, the write operation can write the object and simply truncate its version history. In such situations where the version history of an object is truncated, there is a possibility that the truncation of the history will not impact any future transactions. That is to say, there is the possibility that no future transactions will require the versions of the object that have been truncated. However, even if they do, the method 900 for reading the object can detect that the version history has been truncated and simply abort the transaction, thereby preventing invalid data being read. Furthermore, by allowing transactions to gracefully handle situations in which read operations encounter objects for which previous versions are required, but the version history has been truncated, the methods 900 and 1000 enable the distributed memory system to only keep the previous versions of objects on the same node 210 as the primary copy of an object without needing to replicate the previous versions of the objects to the nodes 210 which store the backup copies of the object. This is because, if the node were to fail, the backup copies of the object can be treated as if their version histories have been truncated, which can be graceful handled by read transactions. Therefore, the amount of memory and processing and communication overhead required to maintain the previous versions of objects in a distributed multi-version memory system can be greatly reduced.

In a multi-version memory system, it is desirable to keep the previous versions of objects available only until such a time that they will no longer be needed by any transaction that is running in the system. Otherwise, memory is used up storing previous versions of objects which will not be used. The process of identifying and freeing up the memory used by previous versions of objects which will no longer be used is referred to as garbage collection. To assist in garbage collection, every previous version of objects stored in the memory system is associated with two timestamps, a first time stamp which is the timestamp associated with the version of the object (that is to say the timestamp from which the version of the object is current, with any earlier timestamps being prior to the objects creation or associated with a previous version of the object) and a second timestamp which is the write timestamp of the transaction that created the copy of the object as a previous version of the object (that is to say the latest timestamp at which the version of the object is current, with any subsequent timestamps relating to a newer version of the object). Whilst the first timestamp is used for determining whether the version of an object is the desired version for a particular timestamp, it is the second timestamp which is used determining whether to garbage collect the version of the object.

The distributed multi-version memory system supports distributed transactions. That is to say one of the nodes 210 can initiate a transaction with a particular read time and 'fan-out' the transaction by providing it to multiple other nodes for processing.

Figure 11:
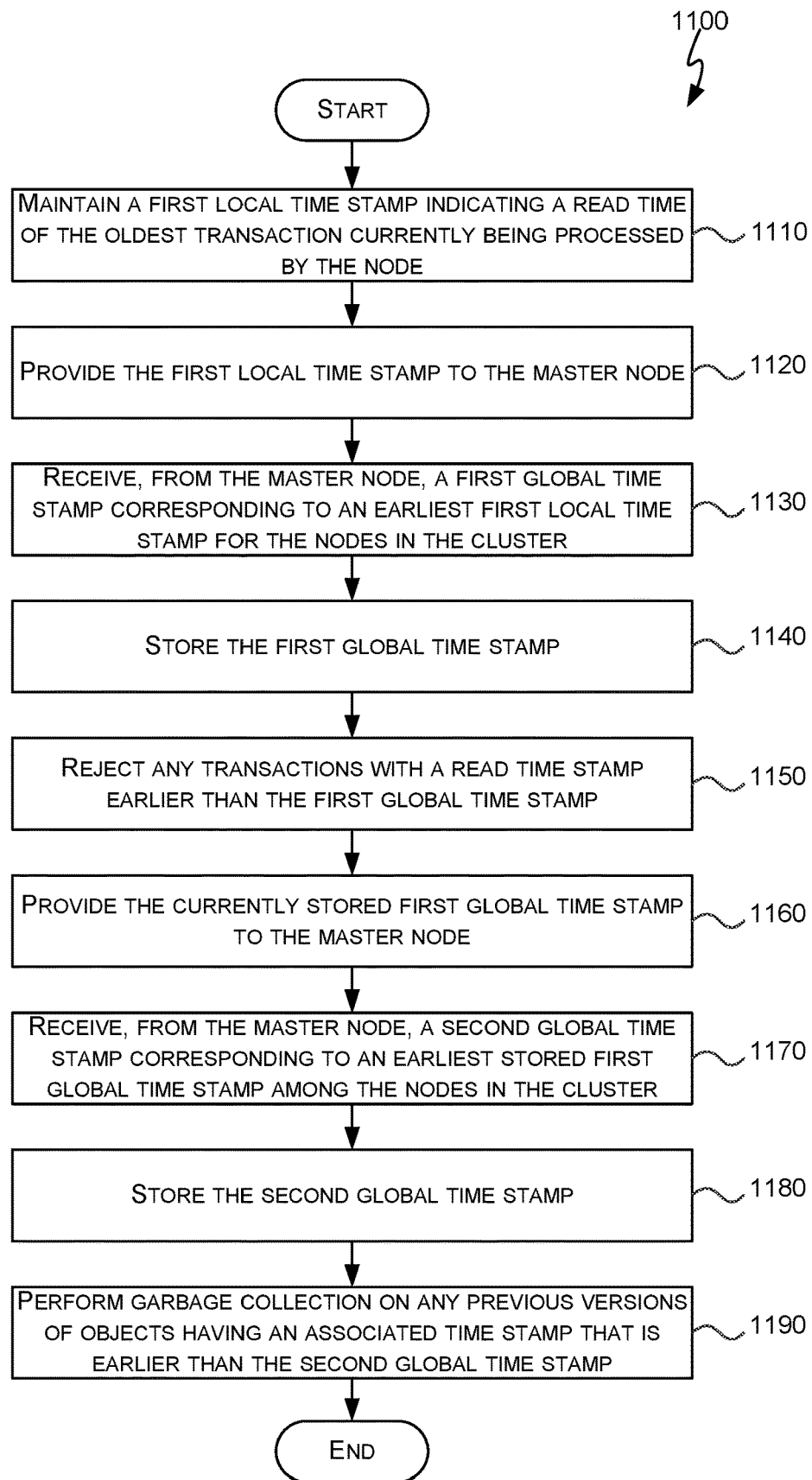
FIG. 11 illustrates an exemplary method for performing garbage collection on the previous versions of objects stored at a node in a distributed multi-version memory system.

FIG. 11 illustrates an exemplary method 1100 for performing garbage collection on the previous versions of objects stored at a node 210 in a distributed multi-version memory system.

At an operation 1110, the method 1100 maintains a first local time stamp indicating a read time of the oldest transaction currently being processed by the node 210. As old transactions are completed on the node 210 this local time stamp is updated to reflect the read timestamp of the new oldest transaction. Whilst the node 210 can guarantee that no transactions on the node will need any previous versions of an object older than this first local time stamp, it is possible, that a transaction currently being processed by one of the other nodes 210 may still require access to those previous versions.

At an operation 1120, the method 1100 provides the first local time stamp to the master node 210 for the cluster 200. The master node 210 determines an oldest active transaction for the cluster 200 from each of the timestamps received from the slave nodes 210 and provides the read timestamp for this oldest active transaction for the cluster 200 back to the slave nodes 210 as a first global time stamp.

At an operation 1130, the method 1100 receives the first global timestamp from the master node 210. The first global timestamp corresponds to the earliest first local timestamp recorded by any node 210 in the cluster 200 (i.e. the first global timestamp provides the read timestamp of the oldest active transaction in the cluster).

At an operation 1140, the method 1100 stores the first global timestamp. The first global timestamp that is stored is a most recently received first global timestamp, overwriting any previously received first global timestamps At an operation 1150, the method 1100 rejects any transactions have a read timestamp which is older than the first global timestamp.

At an operation 1160, the method 1100 provides the currently stored first global time stamp to the master node 210. The master node 210 determines an earliest first global time stamp that is still stored by any of the nodes 210 in the cluster and provides this earliest first global time stamp for the cluster 200 back to the slave nodes 210 as a second global time stamp.

At an operation 1170, the method 1100 receives the second global timestamp from the master node 210. The second global timestamp might be earlier than the first global timestamp that has been stored at the node. In particular, this can occur when one (or more) of the nodes 210 in the cluster 200 have not received an updated first global timestamp at the time the current second global timestamp was generated.

At an operation 1180, the method 1100 stores the second global timestamp. The second global timestamp that is stored is a most recently received second global timestamp, overwriting any previously received second global timestamp.

At an operation 1190, the method 1100 performs garbage collection of any previous versions of objects having a write timestamp (that is to say the write timestamp for the transaction which created the copy of the object as a previous version before overwriting it) is less than the stored second global timestamp. In essence, the garbage collection of the previous versions deallocates the memory that was allocated to storing those previous versions, making it available for future use. This means it is important to ensure that the previous version is not read after it has been garbage collected as the data may have been corrupted by subsequent writes to the deallocated memory space.

It should be noted that whilst the first global timestamp could serve as the garbage collection point in memory systems which don't support parallel execution of transactions across the cluster, it is not sufficient to ensure that no previous versions are garbage collected which might still be needed when parallel execution of transactions across the cluster is supported. This is because, when a distributed transaction with a particular read timestamp is created within the system, the node that sends the transaction could communicate the transaction to another machine for execution and might fail before the transaction is received by the other machine. This means that the first global timestamp could progress beyond the read timestamp of the distributed transaction before it is received by the other machine since none of the nodes remaining in the cluster after the initiating node has failed is aware of the read timestamp for the distributed transaction. This means that some of the nodes in the cluster could start performing garbage collection on previous versions of objects with timestamps later than the read timestamp of the distributed transaction. Meanwhile, the distributed transaction may subsequently be received by the other node prior to the other node receiving the new first global value (receipt of the transaction may be delayed, for example, due to network congestion). Since the other node is not yet aware of the new first global value, it cannot reject the distributed transaction. However, since other nodes in the system may have already garbage collected previous version of objects upon which the distributed transaction relies, the results of processing the distributed transaction will be incorrect. Therefore, it is necessary to generate the second global time stamp, as described above, to prevent this from happening.

It will be appreciated that the generation of the first global timestamp and the second global timestamps for the cluster is ongoing, such that the current first and second global timestamps will advance as transactions are completed within the cluster 200.

In some examples, the method 1100 may be performed in conjunction with the methods described above in relation to FIG. 9 and FIG. 10 for writing and reading previous versions of objects to the distributed multi-version memory system. However, in other examples, the method 1100 may be performed independently from those methods 900 and 1000. The method 1100 allows previous versions of objects to be garbage collected within the memory system at the earliest opportunity (thereby saving memory) whilst guaranteeing that no transaction currently being processed in the distributed system might still need to access them.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following numbered paragraphs (NPs):

NP1. A method performed by a new master node in a cluster of nodes to establish a master clock using a local clock on the new master node following a reconfiguration of the nodes included in the cluster, wherein each of the nodes in the cluster comprises a respective local clock which is synchronized to the master clock, the master clock being provided by an old master node prior to the reconfiguration, the method comprising: a message to the other nodes in the cluster of nodes instructing them to disable their respective local clocks; receiving respective acknowledgements from the other nodes in the cluster of nodes indicating that their respective local clocks have been disabled; identifying a time at which all leases of any nodes which have been removed from the cluster of nodes by the reconfiguration will have expired; waiting until the identified time has passed; determining a maximum value that the master clock provided by the old master node could have been at the identified time; setting the local clock to be greater than the maximum value; and indicating to the other nodes in the cluster of nodes to re-enable their respective local clocks.

NP2. The method of NP1, wherein: each of the nodes in the cluster further maintains a respective measure of uncertainty for their respective local clock that indicates a maximum value of the master clock based on a predetermined maximum rate of clock drift and an amount of time elapsed since the last synchronization of the respective local clock with the master clock; and determining the maximum value that the master clock provided by the old master node could have been at the identified time comprises determining the maximum value from amongst the respective measures of uncertainty maintained from a synchronization with the old master node prior to the reconfiguration by all of the nodes that were present in the cluster prior to the reconfiguration and that remain in the cluster after the reconfiguration.

NP3. The method of NP2, wherein the acknowledgments received from the other nodes in the cluster of nodes indicating that their respective local clocks have been disabled comprise a respective indication of the maximum value of the master clock based on the measure of uncertainty maintained by that node from a synchronization with the old master node prior to the reconfiguration when the node was present in the cluster prior to the reconfiguration.

NP4. The method of any one of NPs 1-3, wherein the new master node was not present in the cluster of nodes prior to the reconfiguration.

NP5. The method of any one of NPs 1-4, wherein indicating to the other nodes in the cluster of nodes to re-enable their respective local clocks comprises: sending a message to the other nodes in the cluster of nodes instructing them to re-enable their respective local clocks.

NP6. The method of any one of NPs 1-4, wherein indicating to the other nodes in the cluster of nodes to re-enable their respective local clocks comprises: responding to requests from the other nodes to synchronize with the master clock.

NP7. A method performed by a slave node in a cluster of nodes to synchronize a local clock of the slave node to a master clock for the cluster of nodes, the master clock being provided by a master node of the cluster of nodes, the method comprising: synchronizing the local clock to the master node; receiving an indication of a new configuration for the cluster, the new configuration indicating a new master node for the cluster; receiving a message from the new master node instructing the slave node to disable the local clock; disabling the local clock; sending a message to the new master node indicating that the local clock has been disabled; receiving an indication from the new master node that the local clock should be re-enabled; and synchronizing the local clock based on timestamps received from the new master node.

NP8. The method of NP7, wherein the method further comprises: maintaining a measure of uncertainty for the local clock that indicates a maximum value of the master clock based on a predetermined maximum rate of clock drift and an amount of time elapsed since the last synchronization of the respective local clock with the master clock; and providing, to the new master node, an indication of the maximum value of the master clock indicated by the measure of uncertainty maintained from a synchronization with the master node.

NP9. The method of NP8, wherein the message that is sent to the new master node indicating that the local clock has been disabled comprises the indication of the maximum value of the master clock.

NP10. The method of any one of NPs 7-9, wherein the method further comprises: receiving a message from the master node instructing the slave node to re-enable the local clock.

NP11. The method of any one of NPs 7-9, wherein the method further comprises: sending one or more synchronization requests to the new master node, wherein the indication that the local clock should be re-enabled is provided by the master node responding to the one of the synchronization requests.

NP12. The method of any one of NPs 7-12, wherein the cluster of nodes utilizes a configuration protocol for reconfiguring the cluster of nodes and selecting a node for managing the configuration of the cluster of nodes, wherein the master clock is provided by the node that is selected for managing the configuration of the cluster.

NP13. The method of NP12, wherein one or more or all of: the message from the new master node instructing the slave node to disable the local clock; the message from the slave node to the new master node indicating that the local clock has been disabled; and the indication from the new master node to the slave node that the local clock should be re-enabled, are provided by inserting additional information into messages of the configuration protocol.

NP14. The method of NP8, wherein the slave node comprises two or more threads, each thread being associated with a respective local clock and synchronizing the local clock to the master node comprises: synchronizing each respective local clock with the remote clock by, in each thread: storing a first value of the local clock for the thread; receiving a remote timestamp indicating a current value of the remote clock from the master node; storing a second value of the local clock for the thread at the time that the remote timestamp was received; and setting the local clock for the thread to the current value of the remote clock based on the remote timestamp; wherein the method further comprises: determining, for each of the threads, a respective maximum value of the remote clock based on the remote timestamp received by that thread, an amount of time elapsed since the stored first value for that thread according to the respective local clock and a pre-determined maximum rate of clock drift; determining, for each of the threads, a respective minimum value of the remote clock based on the remote timestamp received by that thread, an amount of time elapsed since the stored second value for that thread according to the respective local clock and a pre-determined minimum rate of clock drift; determining, from amongst the respective maximum values determined for each of the threads, a lowest maximum value of the remote clock; determining, from amongst the respective minimum values determined for each of the threads, a largest minimum value of the remote clock; and providing an indication of the lowest maximum value and the largest minimum value of the remote clock as the measure of uncertainty for local timestamps provided by each of the respective local clocks.

NP15. The method of NP14, wherein one or more of the threads receives the remote timestamp from the master node via a different communication protocol to a communication protocol used by the other threads.

NP16. The method of NP14 or NP15, wherein one or more of the threads receives the remote timestamp from the master node via a different communication medium to a communication medium used by the other threads.

NP17. The method of any one of NPs 14-16, wherein synchronizing each respective local clock with the remote clock further comprises: requesting a timestamp of the remote clock from the master node, wherein the first value of the local clock that is stored is the value of the local clock at the time that the request is sent to the master node.

NP18. The method of any one of NPs 14-17, wherein the method further comprises: determining, for each thread, whether an actual rate of drift experienced by the local clock exceeds the predetermined maximum or predetermined minimum rates of draft based on the stored first and second values associated with two separate synchronizations; and in response to determining that the received remote timestamp is lower than the determined largest minimum value or higher than the determined lowest maximum value of the remote clock for a thread, disabling the slave node.

NP19. A system for use in a cluster of nodes, the system comprising: a local clock; and a clock synchronization module arranged to synchronize to a master clock for the cluster of nodes provided by a master node of the cluster of nodes, wherein following receipt of a new configuration for the cluster indicating a new master node, the clock synchronization module is arranged to: disable the local clock in response to receiving a message from the new master node instructing the slave node to disable the local clock; send a message to the new master node indicating that the local clock has been disabled; re-enable the local clock in response to receiving an indication from the new master node that the local clock should be re-enabled; and synchronize the local clock based on timestamps received from the new master node.

NP20. The system of NP19, wherein the system further comprises two or more processing cores, each core having a respective local clock and the clock synchronization module comprises two or more synchronization threads arranged to execute on respective ones of the two or more processing cores to synchronize the respective local clocks for the respective ones of the two or more processing cores by storing a first value of the local clock for the thread; receiving a remote timestamp indicating a current value of the remote clock from the master node; storing a second value of the local clock for the thread at the time that the remote timestamp was received; and setting the local clock for the thread to the current value of the remote clock based on the remote timestamp, wherein the clock synchronization module is further configured to: determine, for each of the threads, a respective maximum value of the remote clock based on the remote timestamp received by that thread, an amount of time elapsed since the stored first value for that thread according to the respective local clock and a pre-determined maximum rate of clock drift; determining, for each of the threads, a respective minimum value of the remote clock based on the remote timestamp received by that thread, an amount of time elapsed since the stored second value for that thread according to the respective local clock and a pre-determined minimum rate of clock drift; determining, from amongst the respective maximum values determined for each of the threads, a lowest maximum value of the remote clock; determining, from amongst the respective minimum values determined for each of the threads, a largest minimum value of the remote clock; and providing an indication of the lowest maximum value and the largest minimum value of the remote clock as the measure of uncertainty for local timestamps provided by each of the respective local clocks.

NP21. A method for performing a transaction at a node in a cluster of nodes comprising one or more read operations which read respective objects in a distributed transactional memory system, wherein the node comprises a local clock which is synchronized with a master clock of the cluster of nodes and maintains a measure of uncertainty indicating a current minimum value and a current maximum value of the master clock, the method comprising: generating a read timestamp representing a point in time which is earlier than the current minimum value of the master clock, the read timestamp representing a point in time at which the read operations of the transaction are considered to occur; performing the one or more read operations to read the respective objects; determining, for each of the respective objects, whether a timestamp associated with that object representing a point in time at which that object was written indicates a time that is after the time represented by the read timestamp; in response to determining that the timestamp associated with one of the respective objects indicates a time that is after the time represented by the read time stamp, performing an error handling procedure for that object.

NP22. The method of NP21, further comprising, prior to generating the read timestamp: determining a maximum value of the master clock at the current point in time based on the measure of uncertainty; and waiting until the current minimum value of the master clock indicated by the measure of uncertainty is after the previously determined maximum value of the master clock, wherein the point in time represented by the generated read timestamp is after or equal to the determined maximum value of the master clock.

NP23. The method of NP21 or NP22, wherein the error handling procedure comprises aborting the transaction.

NP24. The method of NP21 or NP22, wherein the memory system is a multi-version memory system and the error handling procedure, in response to determining that the object is associated with a pointer indicating the location of a previous version of the object stored by the distributed transactional memory system: reading the previous version of the object from the location indicated by the pointer; in response to determining that a timestamp associated with the previous version of the object indicates a time that is either before or equal to the time represented by the read time stamp, completing the transaction using the previous version of the object; and in response to determining that the timestamp associated with the previous version of the object indicates a time that is after the time represented by the read time stamp, re-performing the error handling procedure with respect to the previous version of the object.

NP25. The method of any one of NPs 21-24, wherein one or more of the respective objects read by the read operations are stored locally on the node.

NP26. The method of any one of NPs 21-25, wherein one or more of the respective objects read by the read operations are stored remotely on another node in the cluster of nodes.

NP27. The method of any one of NPs 21-26, wherein the memory system is a multi-version memory system and the read operations are arranged to read a particular version of an object stored in a multi-version memory system, the particular version representing the object as it existed at a particular point in time, the method further comprising: determining, based on a timestamp associated with a retrieved version of the object indicating a point in time that is after the particular point in time, that a previous version of the object is required; determining whether version history for the retrieved version of the object has been truncated; in response to determining that the version history for the retrieved version of the object has been truncated, providing an error; in response to determining that the version history for the retrieved version of the object has not been truncated, retrieving the previous version of the object and repeating the previous steps in relation to the previous version of the object until either a version of the object is retrieved which has an associated timestamp which indicates a point in time that is before or equal to the particular point in time or an error is provided.

NP28. The method of NP27, wherein: each version of the object is associated with a respective pointer indicating the location of the previous version of the object; and determining whether version history for the retrieved version of the object has been truncated comprises determining whether a value of the respective pointer for the retrieved version of the object is null.

NP 29. A method for performing a transaction at a node in a cluster of nodes comprising one or more write operations which write to respective objects in a distributed transactional memory system, wherein the node comprises a local clock which is synchronized with a master clock of the cluster of nodes and maintains a measure of uncertainty indicating a current minimum value and a current maximum value of the master clock, the method comprising: reading the respective objects to be written; locking the respective objects to be written to by the one or more write operations; determining, for each of the respective objects for which locks are obtained, that the timestamp associated with that object representing a point in time has not changed since it was read; generating a write timestamp representing a point in time at which the write operations of the transaction are considered to occur based on the measure of uncertainty, the point in time represented by the write timestamp being after a maximum value of the master clock at the point in time that all of the respective objects to be written have been locked; waiting until the current minimum value of the master clock indicated by the measure of uncertainty is after the time represented by the write timestamp; performing the one or more write operations on the respective objects to be written to and committing the transaction by unlocking the respective objects, wherein performing the one or more write operations comprises associating the respective object to be written to with the write timestamp.

NP30. The method of NP29, wherein the memory system is a multi-version memory system and the method further comprises: determining whether version history for the object should be truncated based on whether there is sufficient memory available for storing both the new version of the object and a current version of the object; associating an indication as to whether the version history for the object has been truncated with the new version of the object; and when the version history for the object should not be truncated, associating an indication of a location of a copy of the current version of the object with the new version of the object; writing the new version of the object to the multi-version transaction memory system.

NP31. The method of NP30, wherein the indication as to whether the version history for the object has been truncated comprises a pointer, the pointer providing the indication of the location of the copy of the current version of the object when the version history is to be maintained or a null value when the version history is to be truncated.

NP32. The method of NP30 or NP31 further comprising, in response to determining that version history for the object should be maintained: allocating memory for storing a copy of the current version of the object; and creating a copy of the current version of the object in the allocated memory, wherein the new version is overwritten over the current version of the object and the indication of the location of the copy of the current version of the object indicates the allocated memory.

NP33. The method of any one of NP32, wherein each node in the cluster is arranged to perform Remote Direct Memory Access reads to read and write to objects stored on the other nodes in the cluster.

NP34. The method of any one of NPs 21-33, wherein the memory system is a multi-version memory system and the method further comprises: maintaining a first local timestamp indicating a read time of the oldest transaction that is currently being processed by the node; providing the first local timestamp to a master node of the cluster of nodes; receiving, from the master node, a first global timestamp corresponding to an earliest first local timestamp received by the master node from the nodes in the cluster; storing the first global timestamp, the stored first global timestamp being the most recently received first global timestamp; rejecting any transactions that comprise a read timestamp that indicates a time that is older than the stored first global timestamp; providing the stored first global timestamp to the master node; receiving, from the master node, a second global timestamp corresponding to an earliest stored first global timestamp received by the master node from the nodes in the cluster; storing the second global timestamp, the stored second global timestamp being the most recently received second global timestamp; and performing garbage collection on each of a plurality of previous versions of objects stored on the node when a respective write timestamp associated with the previous version is less than the stored second global timestamp.

NP35. A system for use as a node in a cluster of nodes forming a distributed transactional memory system, the system comprising: a local clock; a clock synchronization module configured to synchronize the local clock with a master clock of the cluster of nodes and maintain a measure of uncertainty indicating a current minimum value and a current maximum value of the master clock; and a transaction processing module arranged to perform transactions comprising one or more read operations which read respective objects in the distributed transactional memory system by: generating a read timestamp from the local clock representing a point in time which is earlier than the current minimum value of the master clock, the read timestamp representing a point in time at which the read operations of the transaction are considered to occur; performing the one or more read operations to read the respective objects; determining, for each of the respective objects, whether a timestamp associated with that object representing a point in time at which that object was written indicates a time that is after the time represented by the read timestamp; and in response to determining that the timestamp associated with one of the respective objects indicates a time that is after the time represented by the read time stamp, performing an error handling procedure for that object.

NP36. The system of NP35, wherein, prior to generating the read timestamp, the transaction processing module is further arranged to: determine a maximum value of the master clock at the current point in time based on the measure of uncertainty; and wait until the current minimum value of the master clock indicated by the measure of uncertainty is after the previously determined maximum value of the master clock, wherein the point in time represented by the generated read timestamp is after or equal to the determined maximum value of the master clock.

NP37. The system of NP35 or NP36, wherein the memory system is a multi-version memory system and the transaction processing module is arranged to perform the error handling procedure by, in response to determining that the object is associated with a pointer indicating the location of a previous version of the object stored by the distributed transactional memory system: reading the previous version of the object from the location indicated by the pointer; in response to determining that a timestamp associated with the previous version of the object indicates a time that is either before or equal to the time represented by the read time stamp, completing the transaction using the previous version of the object; and in response to determining that the timestamp associated with the previous version of the object indicates a time that is after the time represented by the read time stamp, re-performing the error handling procedure with respect to the previous version of the object.

NP38. The system of any one of NPs 35-37, wherein the transaction processing module is further arranged to process a read operation which reads a particular version of an object stored in a multi-version memory system, the particular version representing the object as it existed at a particular point in time, by: determining, based on a timestamp associated with a retrieved version of the object indicating a point in time that is after the particular point in time, that a previous version of the object is required; determining whether version history for the retrieved version of the object has been truncated; in response to determining that the version history for the retrieved version of the object has been truncated, providing an error; and in response to determining that the version history for the retrieved version of the object has not been truncated, retrieving the previous version of the object and repeating the previous steps in relation to the previous version of the object until either a version of the object is retrieved which has an associated timestamp which indicates a point in time that is before or equal to the particular point in time or an error is provided.

NP39. The system of any one of NPs 35-38, wherein the transaction processing module is further arranged to perform transactions comprising one or more write operations which write respective objects in the distributed transaction memory system by: reading the respective objects to be written; locking the respective objects to be written to by the one or more write operations; determining, for each of the respective objects for which locks are obtained, that the timestamp associated with that object representing a point in time has not changed since it was read; generating a write timestamp representing a point in time at which the write operations of the transaction are considered to occur based on the measure of uncertainty, the point in time represented by the write timestamp being after a maximum value of the master clock at the point in time that all of the respective objects to be written have been locked; waiting until the current minimum value of the master clock indicated by the measure of uncertainty is after the time represented by the write timestamp; determining, after waiting until the current minimum value of the master clock is after the time represented by the write timestamp, that the respective timestamps associated with each of the respective objects read by the one or more read operations is still after the time represented by the read timestamp; performing the one or more write operations on the respective objects to be written to and committing the transaction by unlocking the respective objects, wherein performing the one or more write operations comprises associating the respective object to be written to with the write timestamp.

NP40. The system of any one of NPs 35-39, wherein the memory system is a multi-version memory system and the system further comprises a garbage collection module arranged to release memory used by previous versions of objects stored in the memory system by: maintaining a first local timestamp indicating a read time of the oldest transaction that is currently being processed by the node; providing the first local timestamp to a master node of the cluster of nodes; receiving, from the master node, a first global timestamp corresponding to an earliest first local timestamp received by the master node from the nodes in the cluster; storing the first global timestamp, the stored first global timestamp being the most recently received first global timestamp; rejecting any transactions that comprise a read timestamp that indicates a time that is older than the stored first global timestamp; providing the stored first global timestamp to the master node; receiving, from the master node, a second global timestamp corresponding to an earliest stored first global timestamp received by the master node from the nodes in the cluster; storing the second global timestamp, the stored second global timestamp being the most recently received second global timestamp; and performing garbage collection on each of a plurality of previous versions of objects stored on the node when a respective write timestamp associated with the previous version is less than the stored second global timestamp.

NP41. A method for performing garbage collection in a distributed multi-version transactional memory system, the distributed multi-version transactional memory system being provided by a cluster of nodes, the method comprising, at a node in the cluster: maintaining a first local timestamp indicating a read time of the oldest transaction that is currently being processed by the node;

providing the first local timestamp to a master node of the cluster of nodes; receiving, from the master node, a first global timestamp corresponding to the an earliest first local timestamp received by the master node from the nodes in the cluster; storing the first global timestamp, the stored first global timestamp being the most recently received first global timestamp; rejecting any transactions that comprise a read timestamp that indicates a time that is older than the stored first global timestamp; providing the stored first global timestamp to the master node; receiving, from the master node, a second global timestamp corresponding to an earliest stored first global timestamp received by the master node from the nodes in the cluster; storing the second global timestamp, the stored second global timestamp being the most recently received second global timestamp; and performing garbage collection on each of a plurality of previous versions of objects stored on the node when a respective write timestamp associated with the previous version is less than the stored second global timestamp.

NP42. A method for writing a new version of an object in a multi-version memory system, the method comprising: determining whether version history for the object should be truncated based on whether there is sufficient memory available for storing both the new version of the object and a current version of the object; associating an indication as to whether the version history for the object has been truncated with the new version of the object; and when the version history for the object should not be truncated, associating an indication of a location of a copy of the current version of the object with the new version of the object; writing the new version of the object to the multi-version transaction memory system.

NP43. The method of NP42, wherein the indication as to whether the version history for the object has been truncated comprises a pointer, the pointer providing the indication of the location of the copy of the current version of the object when the version history is to be maintained or a null value when the version history is to be truncated.

NP44. The method of NP42 or NP43 further comprising, in response to determining that version history for the object should be maintained: allocating memory for storing a copy of the current version of the object; and creating a copy of the current version of the object in the allocated memory, wherein the new version is overwritten over the current version of the object and the indication of the location of the copy of the current version of the object indicates the allocated memory.

NP45. A method for reading a particular version of an object stored in a multi-version memory system, the particular version representing the object as it existed at a particular point in time, the method comprising: determining, based on a timestamp associated with a retrieved version of the object indicating a point in time that is after the particular point in time, that a previous version of the object is required; determining whether version history for the retrieved version of the object has been truncated; in response to determining that the version history for the retrieved version of the object has been truncated, providing an error; in response to determining that the version history for the retrieved version of the object has not been truncated, retrieving the previous version of the object and repeating the previous steps in relation to the previous version of the object until either a version of the object is retrieved which has an associated timestamp which indicates a point in time that is before or equal to the particular point in time or an error is provided.

NP46. The method of NP45, wherein: each version of the object is associated with a respective pointer indicating the location of the previous version of the object; and determining whether version history for the retrieved version of the object has been truncated comprises determining whether a value of the respective pointer for the retrieved version of the object is null.

NP47. A method for synchronizing a slave node in a cluster of nodes with a remote clock at a master node in the cluster of nodes, the slave node comprising two or more threads, each thread being associated with a respective local clock, the method comprising: synchronizing each respective local clock with the remote clock by, in each thread: storing a first value of the local clock for the thread; receiving a remote timestamp indicating a current value of the remote clock from the master node; storing a second value of the local clock for the thread at the time that the remote timestamp was received; and setting the local clock for the thread to the current value of the remote clock based on the remote timestamp; determining, for each of the threads, a respective maximum value of the remote clock based on the remote timestamp received by that thread, an amount of time elapsed since the stored first value for that thread according to the respective local clock and a pre-determined maximum rate of clock drift; determining, for each of the threads, a respective minimum value of the remote clock based on the remote timestamp received by that thread, an amount of time elapsed since the stored second value for that thread according to the respective local clock and a pre-determined minimum rate of clock drift; determining, from amongst the respective maximum values determined for each of the threads, a lowest maximum value of the remote clock; determining, from amongst the respective minimum values determined for each of the threads, a largest minimum value of the remote clock; and providing an indication of the lowest maximum value and the largest minimum value of the remote clock as a measure of uncertainty for local timestamps provided by each of the respective local clocks.

NP48. The method of NP47, wherein one or more of the threads receives the remote timestamp from the master node via a different communication protocol to a communication protocol used by the other threads.

NP49. The method of NP47 or NP48, wherein one or more of the threads receives the remote timestamp from the master node via a different communication medium to a communication medium used by the other threads.

NP50. The method of any one of NPs 47-49, wherein synchronizing each respective local clock with the remote clock further comprises: requesting a timestamp of the remote clock from the master node, wherein the first value of the local clock that is stored is the value of the local clock at the time that the request is sent to the master node.

NP51. The method of any one of NPs 47-50, wherein the method further comprises: determining, for each thread, whether an actual rate of drift experienced by the local clock exceeds the predetermined maximum or predetermined minimum rates of draft based on the stored first and second values associated with two separate synchronizations; and in response to determining that the received remote timestamp is lower than the determined largest minimum value or higher than the determined lowest maximum value of the remote clock for a thread, disabling the slave node.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method for performing a transaction at a node in a cluster of nodes comprising one or more read operations which read respective objects in a distributed transactional memory system, wherein the node comprises a local clock which is synchronized with a master clock of the cluster of nodes and maintains a measure of uncertainty indicating a current minimum value and a current maximum value of the master clock, the method comprising:

determining, prior to generating a read timestamp, the maximum value of the master clock at a point in time based on the measure of uncertainty;

waiting, prior to generating the read timestamp, until the current minimum value of the master clock indicated by the measure of uncertainty is after the determined maximum value of the master clock;

generating the read timestamp representing a point in time which is earlier than the current minimum value of the master clock, the read timestamp representing a point in time at which the read operations of the transaction are considered to occur, wherein the point in time represented by the generated read timestamp is after or equal to the determined maximum value of the master clock;

performing the one or more read operations to read the respective objects;

determining, for each of the respective objects, whether a timestamp associated with that object representing a point in time at which that object was written indicates a time that is after the time represented by the read timestamp; and in response to determining that the timestamp associated with one of the respective objects indicates a time that is after the time represented by the read time stamp, performing an error handling procedure for that object.

2. The method of claim 1, wherein the measure of uncertainty is based on a predetermined maximum rate of clock drift and an amount of time elapsed since a last synchronization with the master clock.

3. The method of claim 1, wherein the error handling procedure comprises aborting the transaction.

4. The method of claim 1, wherein the memory system is a multi-version memory system and the error handling procedure, in response to determining that the object is associated with a pointer indicating the location of a previous version of the object stored by the distributed transactional memory system:

reading the previous version of the object from the location indicated by the pointer;

in response to determining that a timestamp associated with the previous version of the object indicates a time that is either before or equal to the time represented by the read time stamp, completing the transaction using the previous version of the object; and in response to determining that the timestamp associated with the previous version of the object indicates a time that is after the time represented by the read time stamp, re-performing the error handling procedure with respect to the previous version of the object.

5. The method of claim 1, wherein one or more of the respective objects read by the read operations are stored locally on the node.

6. The method of claim 1, wherein one or more of the respective objects read by the read operations are stored remotely on another node in the cluster of nodes.

7. The method of claim 1, wherein the memory system is a multi-version memory system and the read operations are arranged to read a particular version of an object stored in a multi-version memory system, the particular version representing the object as it existed at a particular point in time, the method further comprising:

determining, based on a timestamp associated with a retrieved version of the object indicating a point in time that is after the particular point in time, that a previous version of the object is required;

determining whether version history for the retrieved version of the object has been truncated;

in response to determining that the version history for the retrieved version of the object has been truncated, providing an error;

in response to determining that the version history for the retrieved version of the object has not been truncated, retrieving the previous version of the object and repeating the previous steps in relation to the previous version of the object until either a version of the object is retrieved which has an associated timestamp which indicates a point in time that is before or equal to the particular point in time or an error is provided.

8. The method of claim 7, wherein:

each version of the object is associated with a respective pointer indicating the location of the previous version of the object; and determining whether version history for the retrieved version of the object has been truncated comprises determining whether a value of the respective pointer for the retrieved version of the object is null.

9. The method of claim 1, wherein the memory system is a multi-version memory system and the method further comprises:

maintaining a first local timestamp indicating a read time of the oldest transaction that is currently being processed by the node;

providing the first local timestamp to a master node of the cluster of nodes;

receiving, from the master node, a first global timestamp corresponding to an earliest first local timestamp received by the master node from the nodes in the cluster;

storing the first global timestamp, the stored first global timestamp being the most recently received first global timestamp;

rejecting any transactions that comprise a read timestamp that indicates a time that is older than the stored first global timestamp;

providing the stored first global timestamp to the master node;

receiving, from the master node, a second global timestamp corresponding to an earliest stored first global timestamp received by the master node from the nodes in the cluster;

storing the second global timestamp, the stored second global timestamp being the most recently received second global timestamp; and performing garbage collection on each of a plurality of previous versions of objects stored on the node when a respective write timestamp associated with the previous version is less than the stored second global timestamp.

10. A method for performing a transaction at a node in a cluster of nodes comprising one or more write operations which write to respective objects in a distributed transactional memory system, wherein the node comprises a local clock which is synchronized with a master clock of the cluster of nodes and maintains a measure of uncertainty indicating a current minimum value and a current maximum value of the master clock, the method comprising:

reading the respective objects to be written;
locking the respective objects to be written to by the one or more write operations;
determining, for each of the respective objects for which locks are obtained, that the timestamp associated with that object representing a point in time has not changed since it was read;
generating a write timestamp representing a point in time at which the write operations of the transaction are considered to occur based on the measure of uncertainty, the point in time represented by the write timestamp being after a maximum value of the master clock at the point in time that all of the respective objects to be written have been locked;
waiting until the current minimum value of the master clock indicated by the measure of uncertainty is after the time represented by the write timestamp;
performing the one or more write operations on the respective objects to be written to and committing the transaction by unlocking the respective objects, wherein performing the one or more write operations comprises associating the respective object to be written to with the write timestamp.

11. The method of claim 10, wherein the memory system is a multi-version memory system and the method further comprises:
determining whether version history for the object should be truncated based on whether there is sufficient memory available for storing both the new version of the object and a current version of the object;
associating an indication as to whether the version history for the object has been truncated with the new version of the object; and
when the version history for the object should not be truncated, associating an indication of a location of a copy of the current version of the object with the new version of the object;
writing the new version of the object to the multi-version transaction memory system.

12. The method of claim 11, wherein the indication as to whether the version history for the object has been truncated comprises a pointer, the pointer providing the indication of the location of the copy of the current version of the object when the version history is to be maintained or a null value when the version history is to be truncated.

13. The method of claim 11, further comprising, in response to determining that version history for the object should be maintained:
allocating memory for storing a copy of the current version of the object; and
creating a copy of the current version of the object in the allocated memory,
wherein the new version is overwritten over the current version of the object and the indication of the location of the copy of the current version of the object indicates the allocated memory.

14. The method of claim 13, wherein each node in the cluster is arranged to perform Remote Direct Memory Access reads to read and write to objects stored on the other nodes in the cluster.

15. A system for use as a node in a cluster of nodes forming a distributed transactional memory system, the system comprising:
a local clock;
a clock synchronization module configured to synchronize the local clock with a master clock of the cluster of nodes and maintain a measure of uncertainty indicating a current minimum value and a current maximum value of the master clock; and
a transaction processing module arranged to perform transactions comprising one or more read operations which read respective objects in the distributed transactional memory system by:
determining, prior to generating a read timestamp, the maximum value of the master clock at a point in time based on the measure of uncertainty;
waiting, prior to generating the read timestamp, until the current minimum value of the master clock indicated by the measure of uncertainty is after the previously determined maximum value of the master clock;
generating the read timestamp from the local clock representing a point in time which is earlier than the current minimum value of the master clock, the read timestamp representing a point in time at which the read operations of the transaction are considered to occur, wherein the point in time represented by the generated read timestamp is after or equal to the determined maximum value of the master clock;
performing the one or more read operations to read the respective objects;
determining, for each of the respective objects, whether a timestamp associated with that object representing a point in time at which that object was written indicates a time that is after the time represented by the read timestamp; and
in response to determining that the timestamp associated with one of the respective objects indicates a time that is after the time represented by the read time stamp, performing an error handling procedure for that object.

16. The system of claim 15, wherein the measure of uncertainty is based on a predetermined maximum rate of clock drift and an amount of time elapsed since a last synchronization with the master clock.

17. The system of claim 16, wherein the memory system is a multi-version memory system and the transaction processing module is arranged to perform the error handling procedure by, in response to determining that the object is associated with a pointer indicating the location of a previous version of the object stored by the distributed transactional memory system:
reading the previous version of the object from the location indicated by the pointer;
in response to determining that a timestamp associated with the previous version of the object indicates a time that is either before or equal to the time represented by the read time stamp, completing the transaction using the previous version of the object; and
in response to determining that the timestamp associated with the previous version of the object indicates a time that is after the time represented by the read time stamp, re-performing the error handling procedure with respect to the previous version of the object.

18. The system of claim 17, wherein the transaction processing module is further arranged to process a read operation which reads a particular version of an object stored in a multi-version memory system, the particular version representing the object as it existed at a particular point in time, by:
determining, based on a timestamp associated with a retrieved version of the object indicating a point in time that is after the particular point in time, that a previous version of the object is required;

determining whether version history for the retrieved version of the object has been truncated;

in response to determining that the version history for the retrieved version of the object has been truncated, providing an error; and in response to determining that the version history for the retrieved version of the object has not been truncated, retrieving the previous version of the object and repeating the previous steps in relation to the previous version of the object until either a version of the object is retrieved which has an associated timestamp which indicates a point in time that is before or equal to the particular point in time or an error is provided.

19. The system of claim 15, wherein the transaction processing module is further arranged to perform transactions comprising one or more write operations which write respective objects in the distributed transaction memory system by:

reading the respective objects to be written;

locking the respective objects to be written to by the one or more write operations;

determining, for each of the respective objects for which locks are obtained, that the timestamp associated with that object representing a point in time has not changed since it was read;

generating a write timestamp representing a point in time at which the write operations of the transaction are considered to occur based on the measure of uncertainty, the point in time represented by the write timestamp being after a maximum value of the master clock at the point in time that all of the respective objects to be written have been locked;

waiting until the current minimum value of the master clock indicated by the measure of uncertainty is after the time represented by the write timestamp;

determining, after waiting until the current minimum value of the master clock is after the time represented by the write timestamp, that the respective timestamps associated with each of the respective objects read by the one or more read operations is still after the time represented by the read timestamp;

performing the one or more write operations on the respective objects to be written to and committing the transaction by unlocking the respective objects, wherein performing the one or more write operations comprises associating the respective object to be written to with the write timestamp.

20. The system of claim 15, wherein the memory system is a multi-version memory system and the system further comprises a garbage collection module arranged to release memory used by previous versions of objects stored in the memory system by:

maintaining a first local timestamp indicating a read time of the oldest transaction that is currently being processed by the node;

providing the first local timestamp to a master node of the cluster of nodes;

receiving, from the master node, a first global timestamp corresponding to an earliest first local timestamp received by the master node from the nodes in the cluster;

storing the first global timestamp, the stored first global timestamp being the most recently received first global timestamp;

rejecting any transactions that comprise a read timestamp that indicates a time that is older than the stored first global timestamp;

providing the stored first global timestamp to the master node;

receiving, from the master node, a second global timestamp corresponding to an earliest stored first global timestamp received by the master node from the nodes in the cluster;

storing the second global timestamp, the stored second global timestamp being the most recently received second global timestamp; and performing garbage collection on each of a plurality of previous versions of objects stored on the node when a respective write timestamp associated with the previous version is less than the stored second global timestamp.

* * * * *